United States Patent
Chen et al.

(10) Patent No.: US 8,089,992 B2
(45) Date of Patent: Jan. 3, 2012

(54) SYSTEMS AND METHODS TO MEASURE THE PERFORMANCE OF A DE-JITTER BUFFER

(75) Inventors: Bing Chen, Middletown, NJ (US); David Ramsden, Wall, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 240 days.

(21) Appl. No.: 12/571,109

(22) Filed: Sep. 30, 2009

(65) Prior Publication Data

US 2011/0075577 A1    Mar. 31, 2011

(51) Int. Cl.
    *H04J 3/06* (2006.01)
(52) U.S. Cl. .................... 370/516; 370/412; 370/252
(58) Field of Classification Search .................. 370/241, 370/412, 413, 252, 253, 251, 352, 516; 709/224–226
    See application file for complete search history.

(56) References Cited

U.S. PATENT DOCUMENTS

| | | | |
|---|---|---|---|
| 7,079,486 B2* | 7/2006 | Colavito et al. | 370/231 |
| 2003/0115320 A1* | 6/2003 | Yarroll et al. | 709/224 |
| 2004/0190494 A1* | 9/2004 | Bauer | 370/352 |
| 2006/0221845 A1* | 10/2006 | Winters | 370/250 |
| 2007/0263672 A1* | 11/2007 | Ojala et al. | 370/516 |
| 2008/0049795 A1 | 2/2008 | Lakaniemi | |
| 2010/0142388 A1 | 6/2010 | Ramsden et al. | |

FOREIGN PATENT DOCUMENTS

EP    1919137    5/2008

* cited by examiner

*Primary Examiner* — Gary Mui
(74) *Attorney, Agent, or Firm* — Hanley, Flight & Zimmerman, LLC

(57) ABSTRACT

Systems and methods to measure the performance of a de-jitter buffer are disclosed. In a described example, a method to measure adaptive de-jitter buffer performance includes transmitting a known audio signal via a plurality of packets over a packet-based network, recording a received signal based on the known audio signal, and analyzing the recorded signal to determine one or more of a lower de-jitter buffer size, an upper de-jitter buffer size, a de-jitter buffer expansion speed, or a de-jitter buffer contraction speed based on the recorded signal and the known signal. The example method further includes comparing the one or more of the lower de-jitter buffer size, the upper de-jitter buffer size, the expansion speed, or the contraction speed to a performance requirement, and correcting communication network performance based on the comparison.

4 Claims, 17 Drawing Sheets

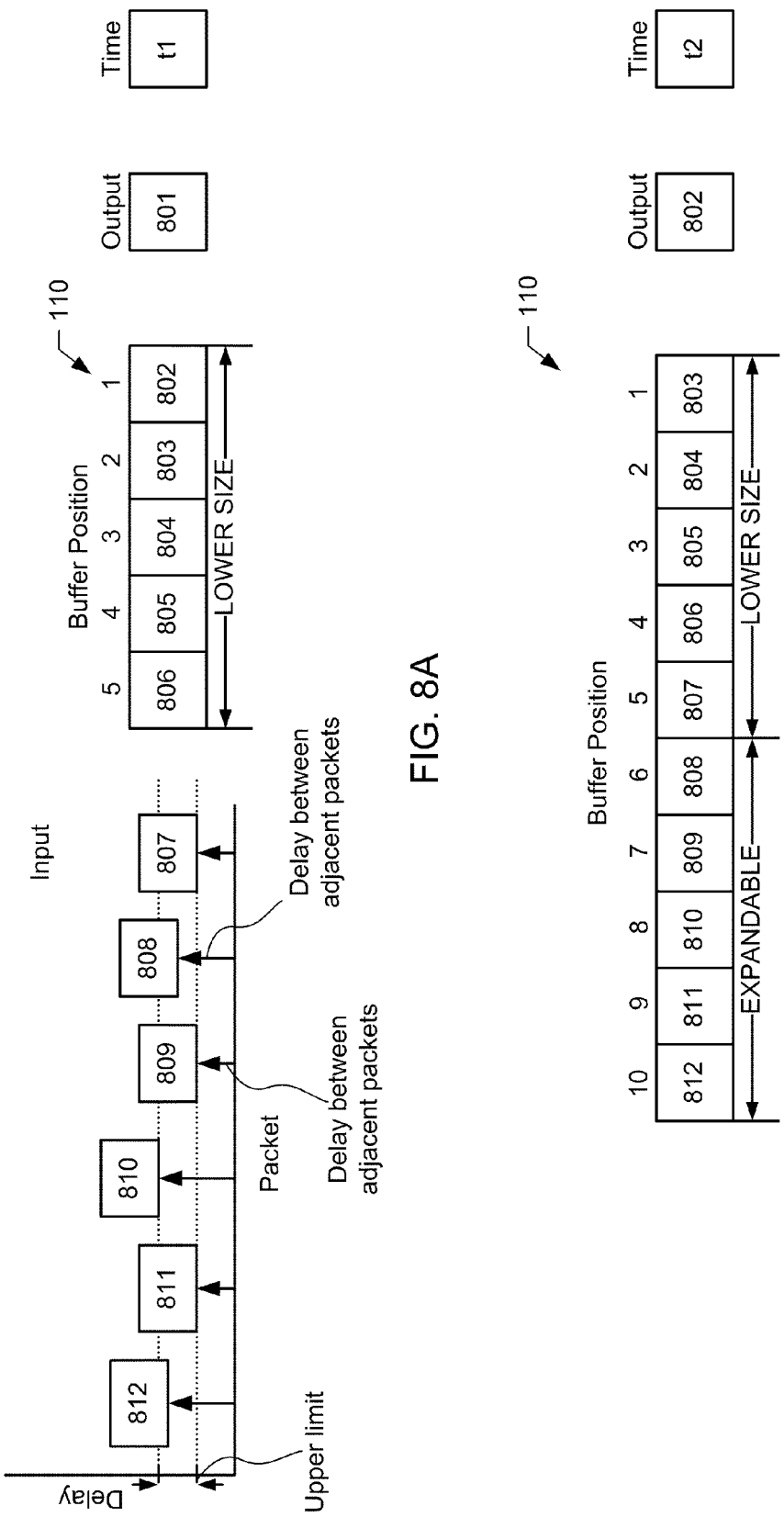

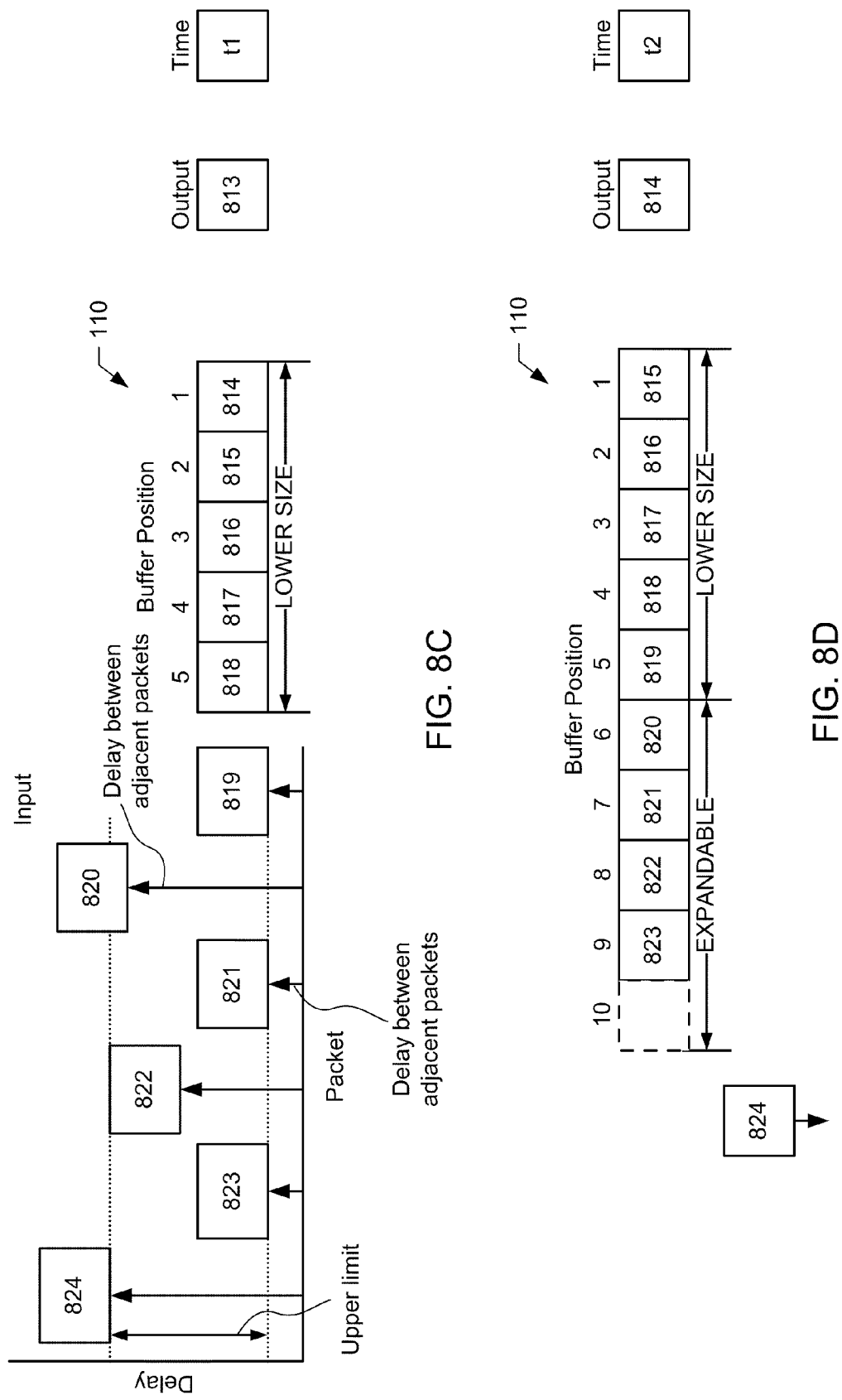

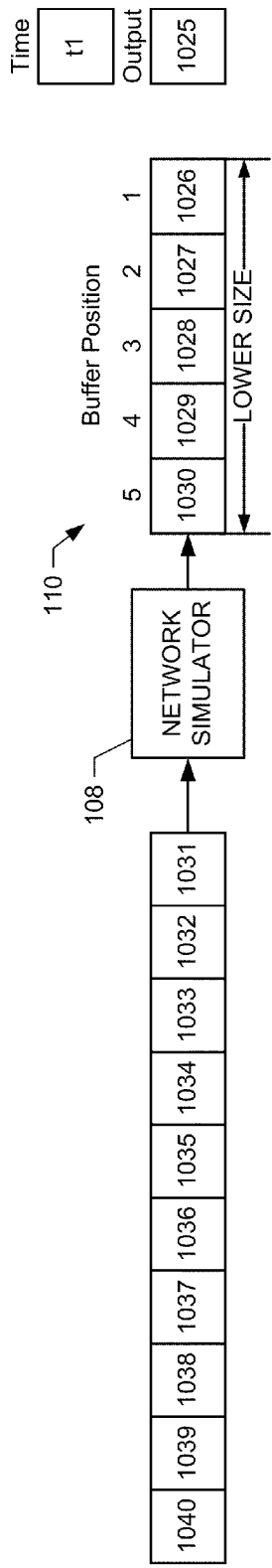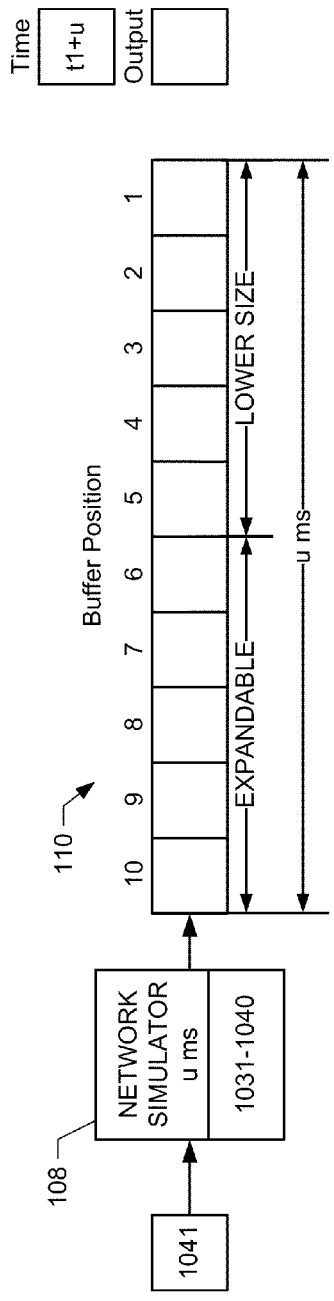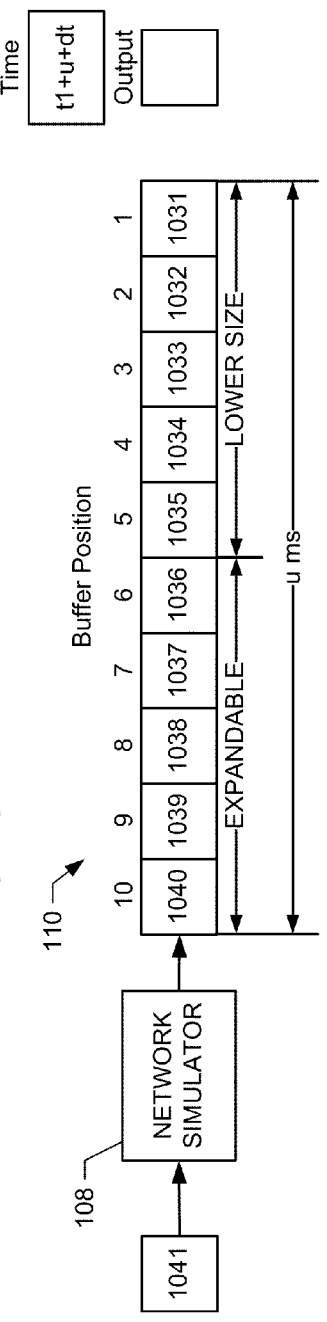
FIG. 10E
FIG. 10F
FIG. 10G

SYSTEMS AND METHODS TO MEASURE THE PERFORMANCE OF A DE-JITTER BUFFER

FIELD OF THE DISCLOSURE

This disclosure relates generally to telecommunications and, more particularly, to systems and methods to measure the performance of a de-jitter buffer.

BACKGROUND

In Voice over Internet Protocol (VoIP) networks, packets arrive at the destination gateway or customer premises equipment (CPE) with packet delay variations, called jitter. When a network is exhibiting large amounts of variation in packet delay, it is exhibiting a correspondingly large amount of jitter. When packet delay is constant (i.e., substantially similar from packet to packet), jitter is low. Gateways and CPEs use de-jitter buffers to remove the packet delay variations and keep the received signal synchronized. De-jitter buffers are typically designed to buffer each arriving packet for a short interval to remove the effects of jitter from a decoded voice stream. De-jitter buffer performance directly impacts VoIP service quality. Misprovisioned or poorly designed de-jitter buffers can degrade VoIP call quality.

De-jitter buffers may be characterized as a fixed buffer or an adaptive buffer. A fixed buffer has a fixed buffer size. An adaptive buffer changes in size to reduce delay between receiving and transmitting a packet and/or to reduce the number of packets discarded when packets arrive too late to be buffered. If a packet loss event or an increase in jitter is detected, an adaptive buffer increases in size. If a decrease in jitter is detected, the adaptive buffer size decreases to reduce delay.

BRIEF DESCRIPTION OF THE DRAWINGS

FIGS. 8A, 8B, 8C, and 8D are example time sequence diagrams illustrating an example de-jitter buffer during a process to measure the upper de-jitter buffer size.

FIGS. 10E, 10F, 10G, 10H, 10I, and 10J are example time sequence diagrams illustrating an example de-jitter buffer during the process of FIG. 9B to measure de-jitter buffer expansion speed.

DETAILED DESCRIPTION

Certain examples are shown in the above-identified figures and described in detail below. In describing these examples, like or identical reference numbers may be used to identify similar elements. The figures are not necessarily to scale and certain features and certain views of the figures may be shown exaggerated in scale or in schematic for clarity and/or conciseness. Although the following discloses example methods, apparatus, and articles of manufacture, it should be noted that such methods, apparatus, and articles of manufacture are merely illustrative and should not be considered as limiting. Accordingly, while the following describes example methods, apparatus, and articles of manufacture, the examples are not the only way to implement such methods, apparatus, and articles of manufacture.

Figure 1:
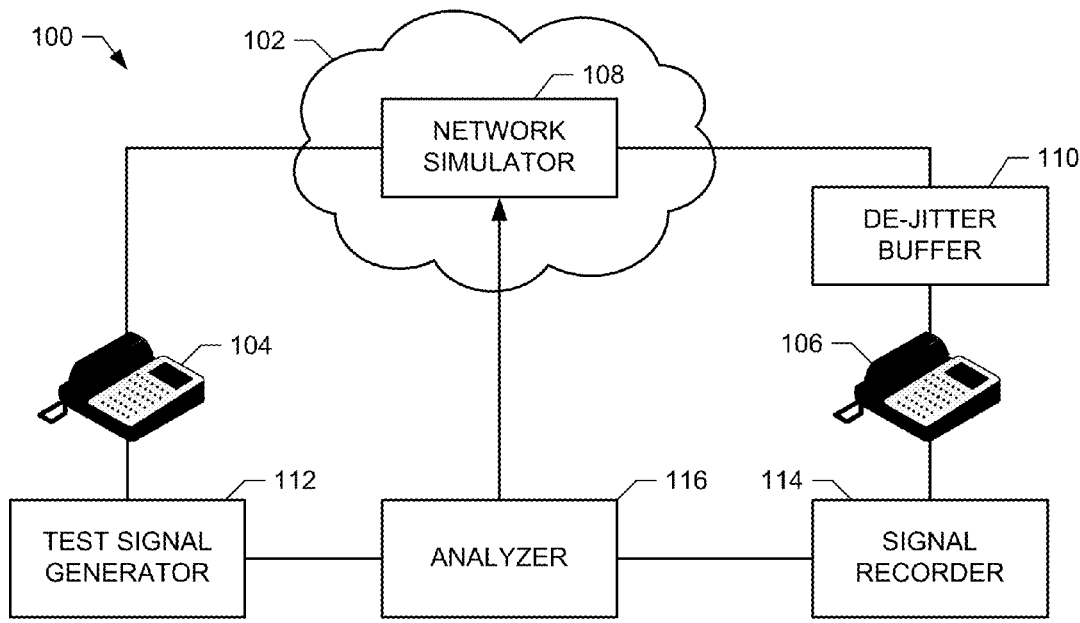
FIG. 1 illustrates an example test network to measure de-jitter buffer performance.

FIG. 1 illustrates an example test network 100 to measure the performance of a de-jitter buffer 110. The test network 100 includes a packet-based network 102 configured to transmit audio information between two audio communication devices 104 and 106. The example audio communication devices 104 and 106 may be implemented by, for example, Voice over Internet Protocol (VoIP) telephones or plain old telephone service (POTS) analog telephones coupled to VoIP adapters, such as terminal adapters or media gateways. VoIP packet traffic is highly time sensitive, and user perception of a VoIP session can suffer if the packets making up a communication are not delivered on time or are not correctly organized (e.g., if they are delivered to the audio communication device in an incorrect order). The example packet-based network 102 includes a network simulator 108 to selectively introduce impairments on the transmission of packets undergoing testing and passing through the network 102. The introduced effects simulate effects that may occur in packet-based networks. For example, the network simulator 108 can introduce packet delay of a desired length into the transmission of the packets, thereby causing the packets transmitted over the network 102 to arrive at intervals of desired lengths. The introduced delays can be varied by relatively large or small amounts to simulate relatively large or small inter-packet delay variation. The example test network 100 allows a tester or a communications network provider to test the performance of the de-jitter buffer 110.

In the example of FIG. 1, jitter (changes in inter-packet delay) is managed using the de-jitter buffer 110. The de-jitter buffer 110 may be maintained at a gateway or customer premises equipment (e.g., a terminal adapter, a media gateway, a VoIP phone). The de-jitter buffer 110 reorganizes packets that are received at different times and/or are received out of order. The example de-jitter buffer 110 further de-packetizes the data and outputs data in a digital voice stream corresponding to the de-packetized data in the correct order and at the correct time. The digital voice stream is converted to an analog voice stream (e.g., via the audio communication device 106) that is output by the audio communication device 106 to allow correct user perception of the intended message. While the de-jitter buffer 110 can receive and queue data packets as fast as they arrive, data is output from the de-jitter buffer 110 at a substantially constant rate corresponding to the amount of audio information contained in each packet (e.g. 20 ms). Over time, the rate at which the de-jitter buffer 110 outputs voice stream data is equal to the average rate at which the buffer 110 receives data.

The de-jitter buffer 110 does not always act like a traditional, clocked buffer in which a packet is stepped through each position of the buffer. In other words, when a packet is input to the de-jitter buffer 110, its position in the buffer is not automatically put in the buffer position immediately adjacent the input. Instead, the position may be accelerated to the last open buffer position. Thus, if a de-jitter buffer 110 is empty when a packet arrives, the packet will be placed in the packet position closest to the output for almost immediate output from the buffer, rather than being clocked through all of the positions in the de-jitter buffer 110. If the buffer is full, the incoming packet or one or the packets in the de-jitter buffer 110 may be dropped, preventing the output of the dropped packet from the audio communication device 106 to a user. The position in which the packet is placed is selected based on packet header information so that it is output in the correct sequential order with the packets already in the de-jitter buffer 110. The correct sequential order is dictated by the transmission order of the packets from the audio communication device 104.

Jitter, as used in the description of the following example implementations, refers to variation in packet delays occurring over time (i.e., inter-packet delay variation). Each packet contains a fixed amount of audio information (e.g. 20 ms). When there is no jitter, the time between arrivals of packets is constant and equals the amount of audio information. For example, if a first packet has a 6 millisecond (ms) delay between transmission by the audio communication device 104 and reception by the de-jitter buffer 110, and a later second packet transmitted after the first packet has a 20 ms delay, the inter-packet delay variation is 14 ms. Inter-packet delay variation may be measured using other methods without departing from the scope of this disclosure.

Packets are output from the de-jitter buffer 110 at a regular or irregular rate. For example, the de-jitter buffer 110 may output packets every 20 ms, corresponding to the 20 ms of audio content contained in the packet. If packets are delayed in the network 102 more than a normal amount and, thus, the de-jitter buffer 110 receives the packets at a reduced rate during a first time period, packets may or may not be received by the de-jitter buffer 110 at a higher rate during a later, second time period, depending on network conditions.

The size of the de-jitter buffer 110 directly affects VoIP service quality. If the de-jitter buffer 110 is too small, a large amount of inter-packet delay variation will cause packets to be dropped during time periods when too many packets are received to be stored in the buffer in such time periods. Such dropped packets will not reach a user, which degrades voice quality. However, if the de-jitter buffer 110 is too large, the user will experience noticeable delays in the call because of delays introduced by the de-jitter buffer 110.

Modern adaptive de-jitter buffers have a lower (i.e., default) de-jitter buffer size, which may be provisioned up to an upper de-jitter buffer size. The lower size may be a minimum size and the upper size may be a maximum size. The de-jitter buffer 110 exhibits an expansion speed (e.g., a rate at which the adaptive de-jitter buffer expands), and a contraction speed (e.g., a rate at which the adaptive de-jitter buffer contracts). The adaptive de-jitter buffer may expand in response to, for example, packet loss or an increase in inter-packet delay variation. The adaptive de-jitter buffer may contract in response to, for example, a decrease in inter-packet delay variation. The lower size of the de-jitter buffer 110, the upper size of the de-jitter buffer 110, the expansion speed, and/or the contraction speed are parameters that may be measured as described below to determine the performance of the de-jitter buffer 110. These parameters are referred to herein as "de-jitter buffer parameters."

A network provider may wish to determine the performance of the de-jitter buffer 110 to ensure that customers are receiving adequate VoIP service. In the illustrated example, to test the de-jitter buffer 110, the network provider uses a test signal generator 112 in communication with a transmitting device (e.g., the audio communication device 104). The network provider also uses a signal recorder 114 in communication with the de-jitter buffer 100 under test and a receiving device (e.g., the audio communication device 106). The network provider also uses an analyzer 116. The test signal generator 112 generates a known test signal for transmission via the audio communication device 104 and the network 102 to the audio communication device 106. An example test signal 1402 that may be generated by the test signal generator 112 is described below with reference to FIGS. 14 and 15. The signal recorder 114 generates a recording of the signals received by the audio communication device 106. If the de-jitter buffer 110 performs correctly during testing, the signal recorder 114 records a reproduction of the known test signal that is substantially similar to the known test signal. However, some of the example methods described below cause distortions and/or irregularities in the recorded signal with respect to the known signal. The distortions and/or irregularities may be introduced by the network simulator 108. The analyzer 116 compares the recorded signal with the known test signal to determine one or more of the de-jitter buffer parameters. In some examples, the network provider may compare the de-jitter buffer parameters to performance requirements and, if necessary, take corrective action to improve the user VoIP experience.

While an example manner of implementing the test network 100 has been illustrated in FIG. 1, one or more of the elements, processes and/or devices illustrated in FIG. 1 may be combined, divided, re-arranged, omitted, eliminated and/or implemented in any other way. Further, the example packet-based network 102, the example network simulator 108, the example test signal generator 112, the example signal recorder 114, the example analyzer 116, and/or, more generally, the example test network 100 of FIG. 1 may be implemented by hardware, software, firmware and/or any combination of hardware, software and/or firmware. Thus, for example, any of the example packet-based network 102, the example network simulator 108, the example test signal generator 112, the example signal recorder 114, the example analyzer 116, and/or, more generally, the example test network 100 could be implemented by one or more circuit(s), programmable processor(s), application specific integrated circuit(s) (ASIC(s)), programmable logic device(s) (PLD(s))

and/or field programmable logic device(s) (FPLD(s)), etc. When any of the appended apparatus claims are read to cover a purely software and/or firmware implementation, at least one of the example packet-based network 102, the example network simulator 108, the example test signal generator 112, the example signal recorder 114, and/or the example analyzer 116 are hereby expressly defined to include a tangible medium such as a memory, DVD, CD, etc. storing the software and/or firmware. Further still, the example test network 100 of FIG. 1 may include one or more elements, processes and/or devices in addition to, or instead of, those illustrated in FIG. 1, and/or may include more than one of any or all of the illustrated elements, processes and devices.

Figure 2:
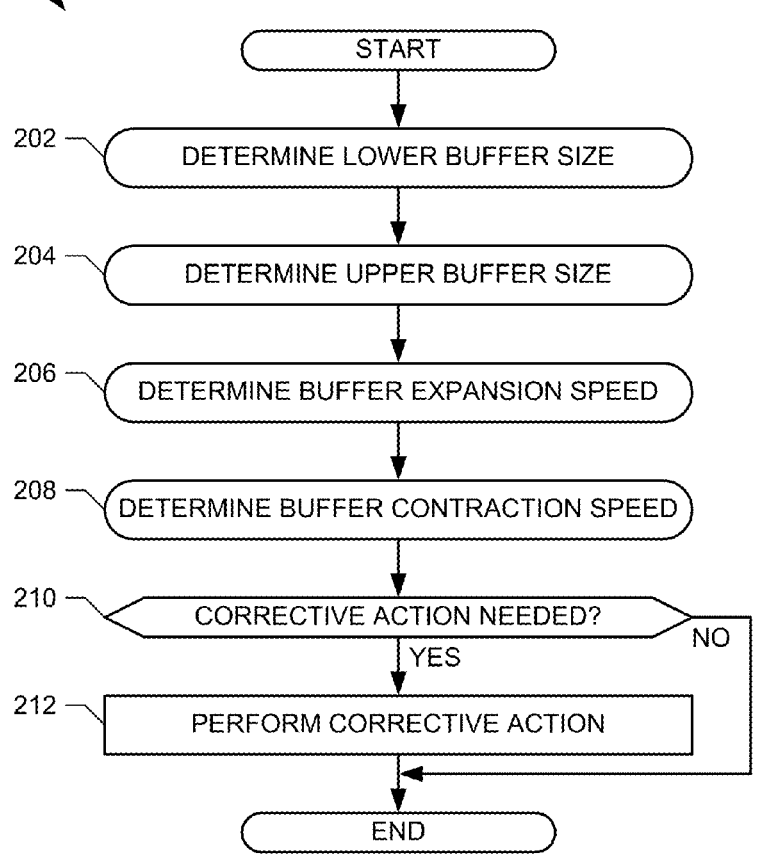
FIG. 2 is a flowchart representative of example machine readable instructions which may be executed to measure adaptive de-jitter buffer performance.

FIG. 2 is a flowchart representative of example machine readable instructions 200 which may be executed to measure de-jitter buffer performance. The example instructions 200 may be executed by the test network 100 of FIG. 1 to provide a network provider with performance data on the de-jitter buffer 110. The analyzer 116 begins by determining the lower (e.g., minimum) size of the de-jitter buffer 110 (block 202). An example implementation of block 202 is described in more detail below with reference to FIGS. 3-6. The analyzer 116 then determines the upper (e.g., maximum) size of the de-jitter buffer 110 (block 204). An example implementation of block 204 is described in more detail below with reference to FIGS. 7, 8A, 8B, 8C, and 8D.

Using the lower and upper sizes of the de-jitter buffer 110, the analyzer 116 then determines the de-jitter buffer 110 expansion speed (block 206). An example implementation of block 206 is described in more detail below with reference to FIGS. 9A, 9B, 10A, 10B, 10C, 10D, 10E, 10F, 10G, 10H, 10I, and 10J. The analyzer 116 further determines the de-jitter buffer 110 contraction speed (block 208). An example implementation of block 208 is described in more detail below with reference to FIGS. 11-13.

The analyzer 116 and/or the network provider then determines whether corrective action is needed based on one or more of the de-jitter buffer parameters determined in blocks 202-208 (block 210). If corrective action is needed or may improve a user's VoIP experience (block 210), the network provider or the analyzer 116 takes the corrective action (block 212). For example, corrective action may include improving quality of service within the network 100 and/or modifying or replacing the de-jitter buffer 110 (or equipment utilizing the de-jitter buffer 110). If no corrective action is required (block 210) or after corrective action is taken (block 212), the example instructions 200 end.

Figure 3:
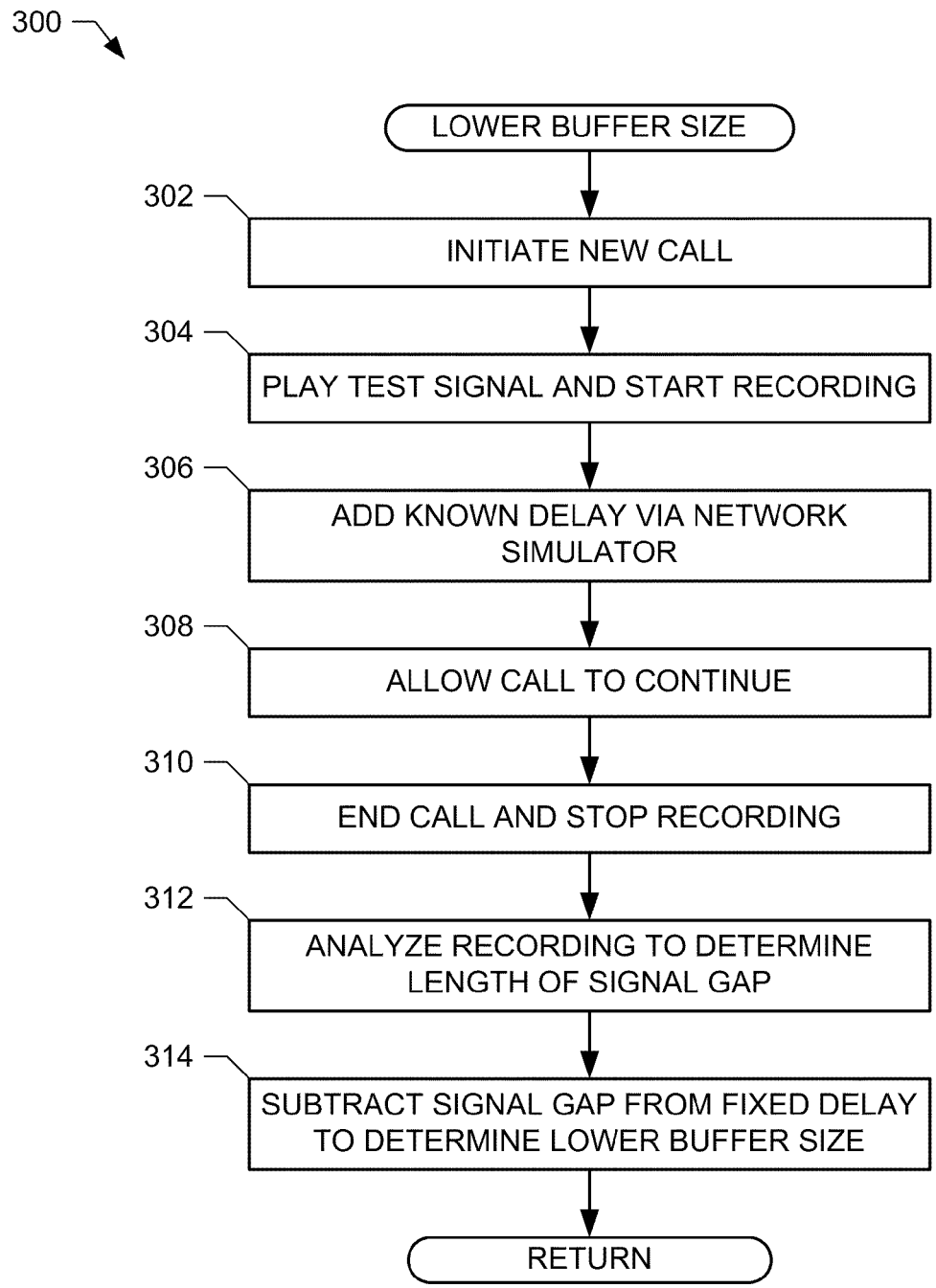
FIG. 3 is a flowchart representative of example machine readable instructions which may be executed to measure a lower de-jitter buffer size.

FIG. 3 is a flowchart representative of example machine readable instructions 300 which may be executed to measure a lower size of a de-jitter buffer. The example instructions 300 may be executed by the test network 100 of FIG. 1 to implement block 202 of FIG. 2 to measure the lower de-jitter buffer size for the de-jitter buffer 110 of FIG. 1. To measure the lower size of the de-jitter buffer 110, one of the audio communication devices 104 and 106 initiates a new call (block 302). The call of this example is a VoIP call transmitted between the audio communication devices 104 and 106 via packets over the network 102. The test signal generator 112 begins playing a known test signal, which is transmitted to the audio communication device 106 via the network 100 and the de-jitter buffer 110, and the signal recorder 114 begins recording the received signal (block 304). The network 102 and/or the network simulator 108 initially transmit the test signal to the audio communication device 106 without any added delay or any added inter-packet delay variation.

Subsequently, the network simulator 108 adds a known delay of Y milliseconds (ms) during the transmission of the test signal (block 306). The example delay is first applied between transmissions of two consecutive packets and is further applied to the following packets until the call is ended. The call continues with the test signal continuing to be played (block 308). At a later time (e.g., 5-10 seconds after transmission of the delay (block 306)), the call ends and the signal recorder 114 stops recording (block 310). The analyzer 116 analyzes the recording from the signal recorder 114 to locate and determine the length of a signal gap corresponding to the delay introduced at block 306 (block 312). The signal gap may be recognized as silence and/or as an output from a packet loss concealment algorithm implemented by the network 102. Packet loss concealment algorithms attempt to mask packet loss by, for example, inserting zeroes where speech frames are expected, reconstructing a portion of previously-received speech, and/or interpolating missing speech frames using other speech frames. Packet loss concealment may be detected by determining where the received signal is different than expected. The analyzer 116 knows no packets were lost because it has a priori knowledge of the test signal (i.e., the analyzer 116 knows what signal to expect). To determine the lower buffer size, the analyzer 116 subtracts the length of the signal gap (and/or packet loss concealment frames) from the known delay added in block 306 (block 314). After determining the lower size of the de-jitter buffer 110, the example instructions 300 end and control passes to block 204 of FIG. 2. The methodology of FIG. 3 is illustrated below with reference to FIGS. 4A, 4B, and 5.

Figure 4A:
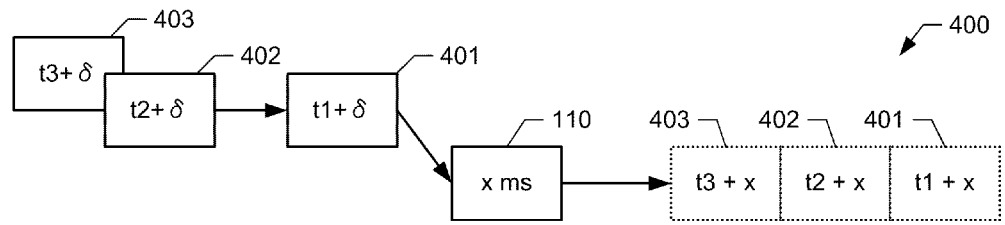
FIGS. 4A and 4B are block diagrams illustrating example de-jitter buffer delay.

FIG. 4A is a block diagram illustrating example de-jitter buffer operation 400. The example de-jitter buffer operation 400 of FIG. 4A is representative of the de-jitter buffer 110 of FIG. 1 during normal operation (e.g., with no added delay). In FIG. 4A, t1, t2, and t3 represent the expected or ideal time that each of respective packets 401, 402, and 403 arrives at the de-jitter buffer 110 if there is no inter-packet delay variation. The term δ represents inter-packet delay variation. The lower buffer size of the de-jitter buffer 110 is x ms, which is unknown. Thus, the de-jitter buffer 110 maintains at least x ms of packets.

After each of the packets 401, 402, and 403 is processed by the de-jitter buffer 110, the delay variation δ is removed and an x ms delay is added by the de-jitter buffer 110. The packets 401, 402, and 403 may also be transformed into a voice stream (e.g., for transmission to the audio communication device 106). Assuming the size of the de-jitter buffer 110 is equal to its lower size, if a packet 401 is received at the de-jitter buffer 110 at time t1+δ, the packet 401 is output from the de-jitter buffer 110 at time t1+x. The term x cannot be directly measured. The following packets 402 and 403 are output from 110 at times t2+x and t3+x, respectively.

Figure 4B:
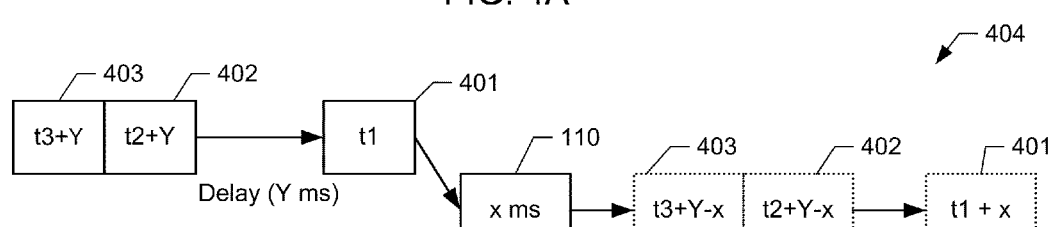

FIG. 4B is a block diagram illustrating example de-jitter buffer operation 404 during measurement of the lower size of the de-jitter buffer 110. The discussion of FIG. 4B will ignore the packet-delay variation δ of the packets 401-403 entering the de-jitter buffer 110. The operation 404 begins while the example de-jitter buffer 110 is filled to its lower size and not past its lower size. A first packet 401 is input to the de-jitter buffer 110 at a first time t1. A delay of Y ms is then added prior to inputting a second packet 402 to the de-jitter buffer. The delay may be provided by, for example, the network simulator 108 of FIG. 1. During the delay, the de-jitter buffer 110 continues to output the packets it contains in accordance with a fixed clock rate. Therefore, if the Y ms delay is greater than the x ms de-jitter buffer 110, the de-jitter buffer 110 empties at time t1+x when the buffer 110 outputs the packet 401. At time t2+Y, the second packet 402 is input to the de-jitter buffer 110. Additional packets may follow.

As mentioned above, the de-jitter buffer 110 outputs packets at a regular or irregular interval, depending on the inter-packet delay variation of the network 102. When the second packet 402 is received by the de-jitter buffer 110 (time t2+Y), the packet 402 is the only packet stored in the de-jitter buffer 110 (assuming Y is greater than x ms) because the de-jitter buffer 110 has emptied during the delay between the first and second packets. Because the second packet 402 arrives after the time when it should have been output, the de-jitter buffer 110 is empty and the packet 402 is immediately advanced to the first position in the de-jitter buffer 110 for substantially immediate output. Thus, the de-jitter buffer 110 outputs the packet 402 at approximately time t2+Y. The delay between the output of the first packet 401 (i.e., at time t1+x) and the output of the second packet 402 as a voice stream (i.e., at time t2+Y) is illustrated in FIG. 4B as Z ms.

Under normal conditions, the time between the end of the packet 401 and the beginning of the packet 402 as represented in the voice stream output is zero. However, because Y ms of delay was added between packets 401 and 402 at the input side of the de-jitter buffer and the de-jitter buffer 110 is empty when the packet 402 is input to the de-jitter buffer 110, the packet 402 is not additionally delayed x ms by the de-jitter buffer 110 as the packet 401 is. Thus, the difference between the end of the packet 401 and the beginning of the packet 402 theoretically is the difference between Y and x at the output stream of the de-jitter buffer 110. The observable gap in the voice stream (e.g., via the analyzer 116) is Z ms. Therefore, the observable gap in the voice stream is equal to the theoretical gap in the voice stream, or $Z=Y-x$ (Equation 1). Equation 1 can be algebraically converted to $x=Y-Z$ (Equation 2). Therefore, by measuring the delay Z ms between the output of the first packet 401 and the output of the second packet 402 and by subtracting the measured delay (Z ms) from the known introduced delay (Y ms), the lower size of the de-jitter buffer 110 (x ms) is determined.

Figure 5:
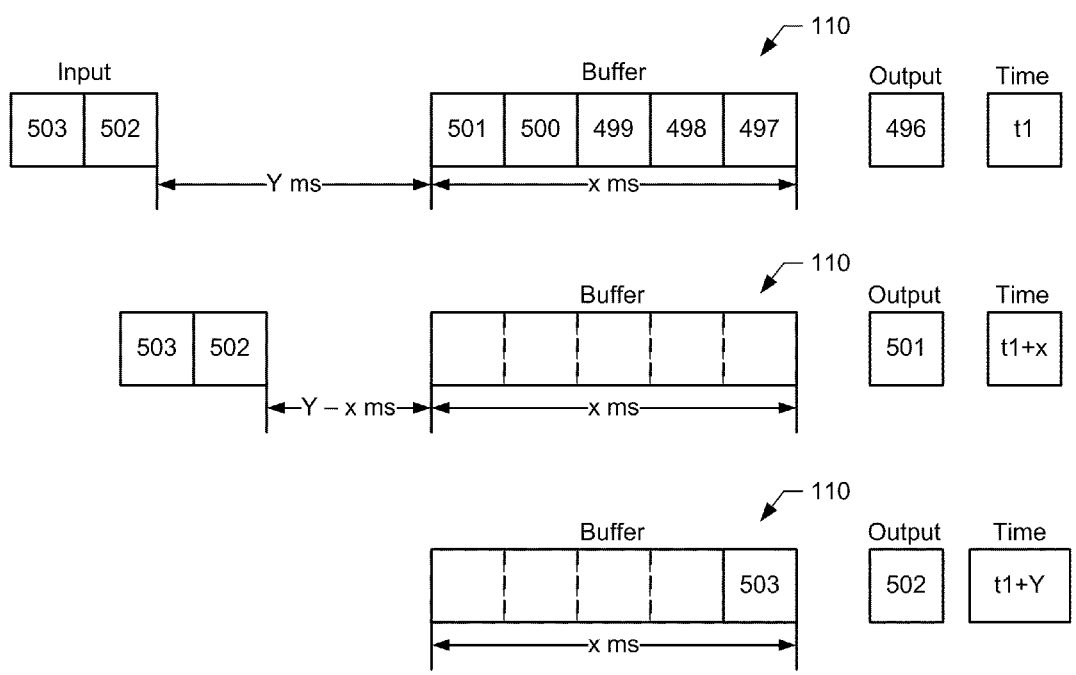
FIG. 5 is a time sequence diagram illustrating de-jitter buffer operation of FIG. 4B at different times.

FIG. 5 is a time sequence diagram illustrating changes in the de-jitter buffer 110 at different times during execution of the example instructions 300 of FIG. 3. The example first packet 501 (e.g., the packet 401 of FIG. 4B) is input to the de-jitter buffer 110 at time t1 and is output from the de-jitter buffer 110 at time t1+x. As described with reference to block 306 of FIG. 3, a known delay of Y ms is added (e.g., by the network simulator 108) between packets 501 and 502 (e.g., the packet 402 of FIG. 4B). The added delay is chosen to be longer than the expected lower size x of the de-jitter buffer 110. Therefore, the de-jitter buffer 110 will enter an empty state when the first packet 501 is output at time t1+x.

At time t2+Y, the de-jitter buffer 110 receives the second packet 502 and immediately outputs the packet 502. (Additional packets 503 following the packet 502 may begin to fill the de-jitter buffer 110 again if received in time.) A gap of Z ms will be seen in the recorded signal corresponding to the time where no signals or packets are output between the packets 501 and 502. The gap length (Z ms) is the difference between x and Y. In other words, the lower size x of the de-jitter buffer 110 is the difference between the added delay Y and the observed delay Z ms, or (Y ms−Z ms). Thus, when the analyzer 116 determines the length of the gap in the recorded signal, the analyzer 116 can determine the lower size x ms of the de-jitter buffer 110 by comparing that gap's size (Z ms) to the introduced delay (Y ms).

Figure 6:
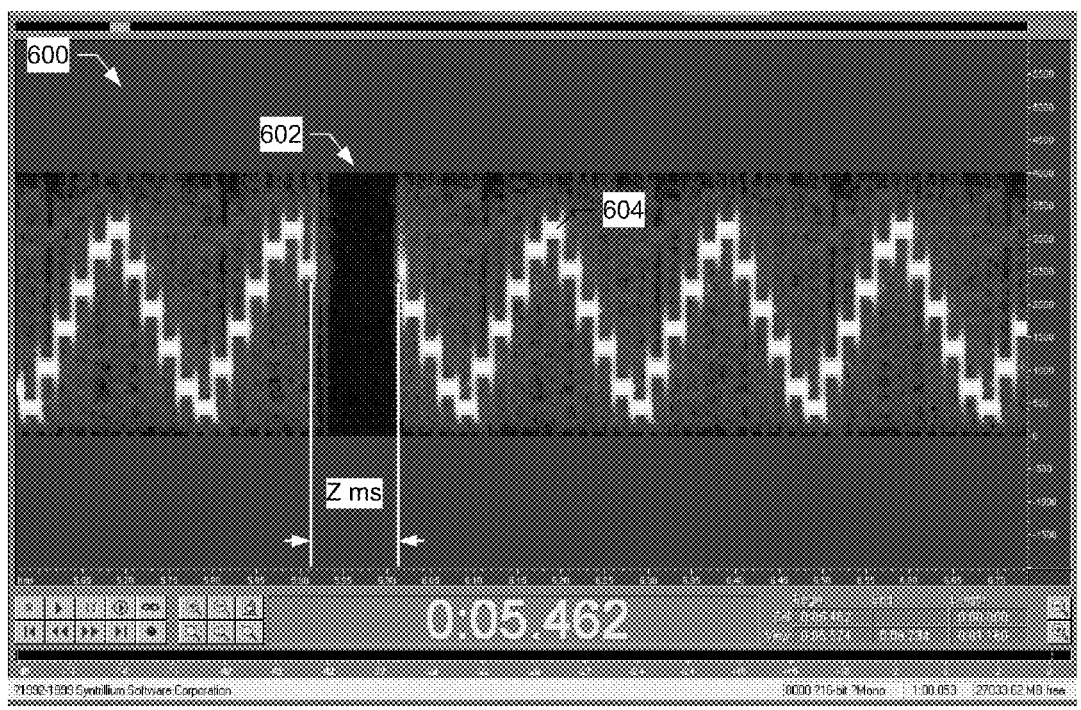
FIG. 6 illustrates an example visual analysis of a recording to determine a lower de-jitter buffer size.

FIG. 6 illustrates an example visual analysis of a recording 600 to determine a lower size of the de-jitter buffer 110. The recording 600 shows a gap 602 in a recorded signal 604. The gap 602 corresponds to the Z ms gap illustrated in FIGS. 4B and 5. The example gap 602 illustrated in FIG. 6 is approximately 6.02 ms-5.92 ms, or approximately 100 ms long. By subtracting the length of the gap 602 from the known delay Y ms, the lower size of the de-jitter buffer 110 is determined.

Figure 7:
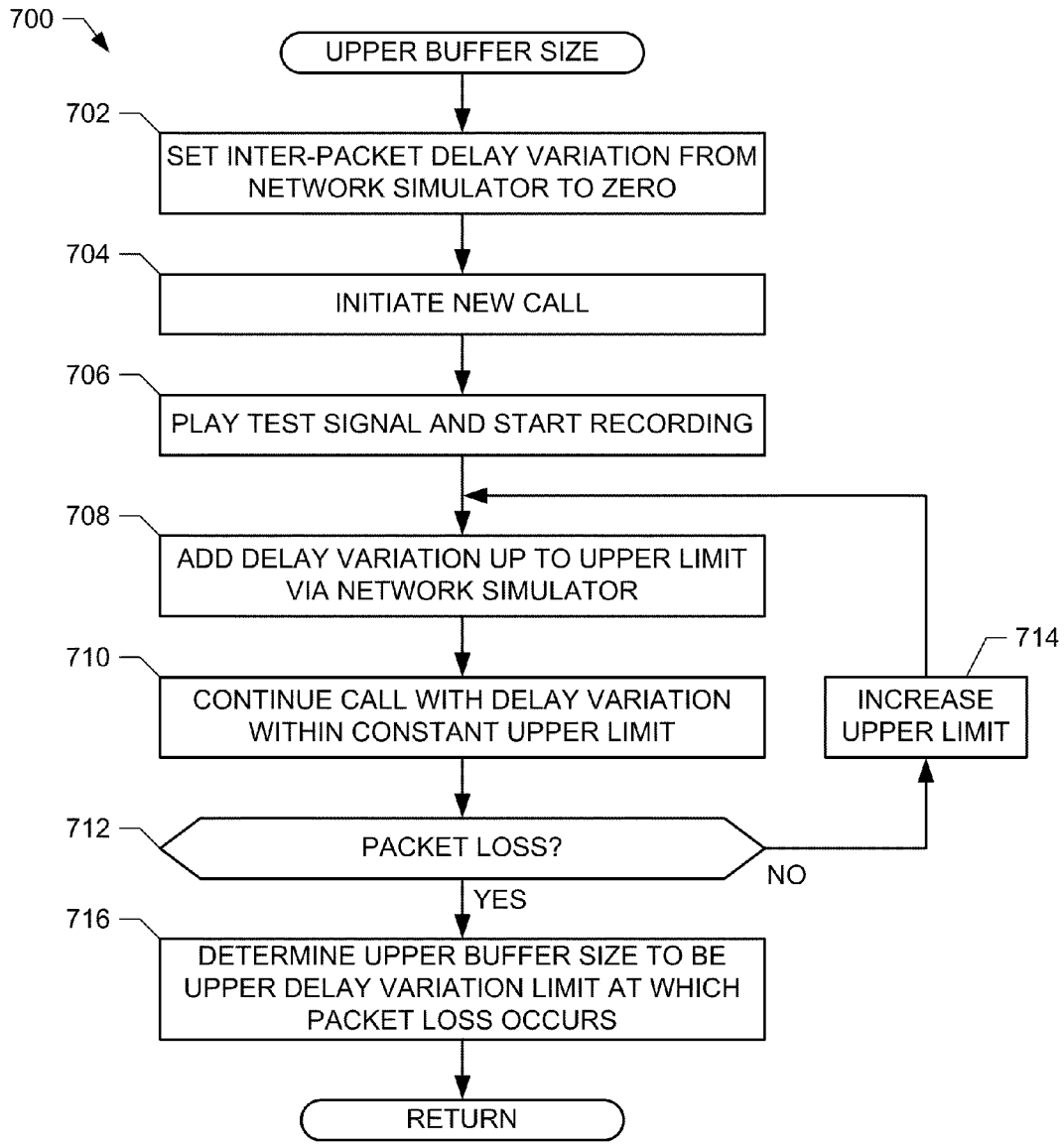
FIG. 7 is a flowchart representative of example machine readable instructions which may be executed to measure an upper de-jitter buffer size.

FIG. 7 is a flowchart representative of example machine readable instructions 700 which may be executed to measure the upper size of the de-jitter buffer 110. The example instructions 700 may be executed by the test network 100 to implement block 204 of FIG. 2. The network simulator 108 begins by setting the inter-packet delay variation level to zero (e.g., no added inter-packet delay variation, packets arrive at substantially the same interval) to pass packets through the network 102 without added delay variation (block 702). The audio communication devices 104 and 106 initiate a new call (block 704). The example test signal generator 112 generates a known test signal for transmission to the audio communication device 106 via the de-jitter buffer 110, and the signal recorder 114 begins recording the signals output by the de-jitter buffer 110 and received at the audio communication device 106 (block 706).

The network simulator 108 holds each packet that passes through it for different lengths of time, which creates inter-packet delay variation (block 708). The network simulator 108 controls the lower and upper limits on inter-packet delays and the delay distribution pattern (e.g., uniform delay, Gaussian delay), and further controls packet re-ordering. The example inter-packet delay is between 0 ms and a constant upper delay variation limit. The call continues with the inter-packet delay variation within the constant upper limit (block 710). The analyzer 116 determines whether any packet loss exists with the level of delay variation added by the network simulator 108 (block 712). If there is no packet loss (block 712), the network simulator increases the upper inter-packet delay variation limit to a new upper inter-packet delay variation limit (block 714). Control then returns to block 708.

If packet loss occurs (block 712), the analyzer 116 may determine the upper buffer size based on the upper inter-packet delay variation limit at which the packet loss occurs (block 716). The example instructions 700 are particularly effective if the upper limit of inter-packet delay variation added by the network simulator 108 starts relatively small and increases by a small increment each time control returns to block 708 due to no detected packet loss at block 712. The example instructions 700 may also be modified to try different upper limits on inter-packet delay variation to narrow down the upper limit at which packet loss occurs. After determining the upper size of the de-jitter buffer 110, the example instructions 700 may end and pass control to block 206.

FIGS. 8A, 8B, 8C, and 8D are example time sequence diagrams illustrating the example de-jitter buffer 110 of FIG. 1 during a process to measure an upper size of the de-jitter buffer 110. The example de-jitter buffer 110 of FIG. 8A receives several packets 807, 808, 809, 810, 811, and 812 having inter-packet delay variation not exceeding an upper limit. Inter-packet delay variation is considered to be the largest packet-to-packet change in delay and is illustrated in FIGS. 8A-8D and 10A-10D as a chart of delays for respective packets. As shown in the illustrated examples, calculated inter-packet delay variation is the absolute value of the differences between the delays of successive packets. Thus, the inter-packet delay variation is equal to the difference between the delays of packets 807 and 808, packets 808 and 809, packets 809 and 810, and so on. In some examples, the network simulator 108 causes the inter-packet delay variation to occur as the packets 807-812 travel through the network 102. Because some de-jitter buffers 110 discard some packets that arrive out of order, the network simulator 108 may deliver the packets in the correct order but with variable delay (i.e., inter-packet delay variation between the packets is insufficient to change the order in which the packets reach the buffer). The arrow beneath each packet in FIG. 8A represents the amount of delay between transmission of the packet by the audio communication device 104 and reception of the packet by the de-jitter buffer 110. The inter-packet delay variation illustrated in FIG. 8A is less than an upper limit set by the network simulator 108.

As the de-jitter buffer 110 receives the packets 807-812, the de-jitter buffer 110 collects and reorganizes (if needed) the packets 807-812. The inter-packet delay variation (e.g., the delay of packet 808 relative to packet 807 less the delay of packet 809 relative to packet 808, the delay of packet 809 relative to packet 808 less the delay of packet 810 relative to packet 809, etc.) illustrated in FIG. 8A is manageable by the de-jitter buffer 110 and no packet dropping occurs as illustrated in FIG. 8B. The delay variation between the packets 809 and 810 in FIG. 8A illustrates a first upper limit on delay variation. In response to failing to detect any packet loss in the output of the de-jitter buffer 110, the analyzer 116 directs the network simulator 108 to increase the upper inter-packet delay variation limit applied to the next set of packets. The analyzer 116 knows no packets were lost because it has a priori knowledge of the test signal (i.e., the analyzer 116 knows what packet to expect).

The example de-jitter buffer 110 of FIG. 8C receives a next set of packets 819-824 having a second upper limit of inter-packet delay variation that is higher than the first upper limit illustrated in FIG. 8A. The delay variation between packets 823 and 824 illustrates the second upper inter-packet delay variation limit. As shown in FIG. 8C, the differences in delay between successive packets is larger than the differences between successive packets in FIG. 8A. This difference can be seen by comparing the arrow lengths of FIG. 8C with the arrow lengths of FIG. 8A. As in FIG. 8A, the inter-packet delay variation has an upper limit in FIG. 8C. As the packets 819-824 traverse the network simulator 108, the de-jitter buffer 110 collects and reorganizes (if needed) the packets 819-824.

In this example, the second upper limit is too high for the example de-jitter buffer 110 to correctly process all the packets 819-824 without packet loss. As a result, the de-jitter buffer 110 drops a packet (e.g., the packet 824 having the longest delay) as illustrated in FIG. 8D, which causes packet loss in the signal recorded by the signal recorder 114. The packet loss in the recorded signal is detected by, for example, the analyzer 116 of FIG. 1. In response to detecting the packet loss, the analyzer 116 may determine that the upper size of the de-jitter buffer 110 is the upper inter-packet delay variation limit illustrated in FIG. 8C. Both inter-packet delay variation and de-jitter buffer size (i.e., length of messages that may be buffered) are measured in ms and, thus, de-jitter buffer size may be determined by measuring amounts of inter-packet delay variation. Additionally or alternatively, the test network 100 may then retest with a smaller upper limit of inter-packet delay variation than the upper limit illustrated in FIG. 8C to further refine the measurement of the upper size of the de-jitter buffer 110.

Figure 9A:
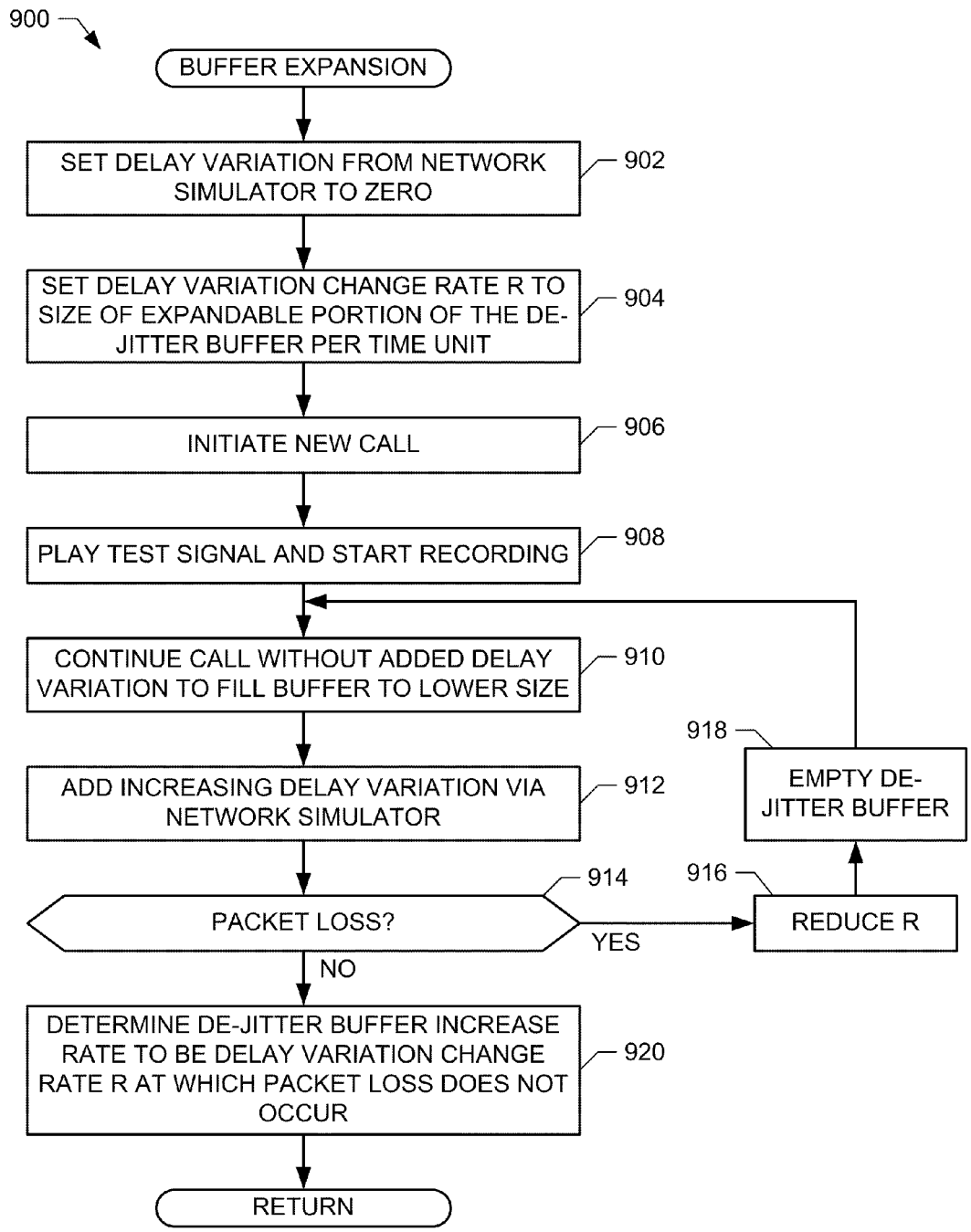
FIG. 9A is a flowchart representative of example machine readable instructions which may be executed to measure de-jitter buffer expansion speed.

FIG. 9A is a flowchart representative of example machine readable instructions 900 which may be executed to measure a de-jitter buffer 110 expansion speed (e.g., in ms/second). The example instructions 900 may be executed by the example test network 100 to implement block 206 of FIG. 2. The network simulator 108 begins by removing any inter-packet delay variation previously introduced by the network simulator 108 (i.e., setting inter-packet delay variation to zero) (block 902). The network simulator 108 then sets an inter-packet delay variation change rate R to be equal to the size of an expandable portion per a unit of time (block 904). In other words, if the size of the expandable portion is 100 ms (as measured above in connection with FIGS. 3 and 7), the jitter change rate R may be set to 100 ms/t seconds. The initial time unit (t seconds) may be an estimate. The example network simulator 108 initially sets the example change rate R to be high (e.g., sets the initial time unit t to be low).

The audio communication devices 104 and 106 initiate a new call (block 906). The example test signal generator 112 generates a known test signal for transmission to the audio communication device 106 via the de-jitter buffer 110, and the signal recorder 114 begins recording the signals received by the audio communication device 106 (block 908). The call continues to fill the de-jitter buffer 110 up to the lower size (block 910).

After the buffer 110 is filled to its lower size, the network simulator 108 adds jitter that increases at the rate R (block 912). As the network simulator 108 adds jitter and the signal recorder 114 records the received signals, the analyzer 116 determines whether the signal recording shows any packet loss (block 914). If the analyzer 116 detects packet loss (block 914), the analyzer 116 instructs the network simulator 108 to reduce the rate R at which the jitter increases (block 916).

The network simulator 108 then cuts off packet delivery to the de-jitter buffer 110 to empty the de-jitter buffer 110 (block 918). To empty the de-jitter buffer 110, the network simulator 108 may, for example, discard packets intended for the de-jitter buffer 110. The de-jitter buffer 110 then continues to output all packets without receiving any further packets, which empties the de-jitter buffer 110. When the de-jitter buffer 110 is empty (block 918), control returns to block 910 to refill the de-jitter buffer 110 to its lower size and then to introduce jitter at a lower rate R' (block 912).

When the analyzer 116 determines that the recorded signal includes packet loss (e.g., at rate R') (block 914), the analyzer 116 determines the de-jitter buffer 110 expansion speed to be an incrementally lower inter-packet delay variation change rate (e.g., R'<R) at which there is no packet loss (block 920). The example instructions 900 end and control passes to block 208.

Figure 9B:
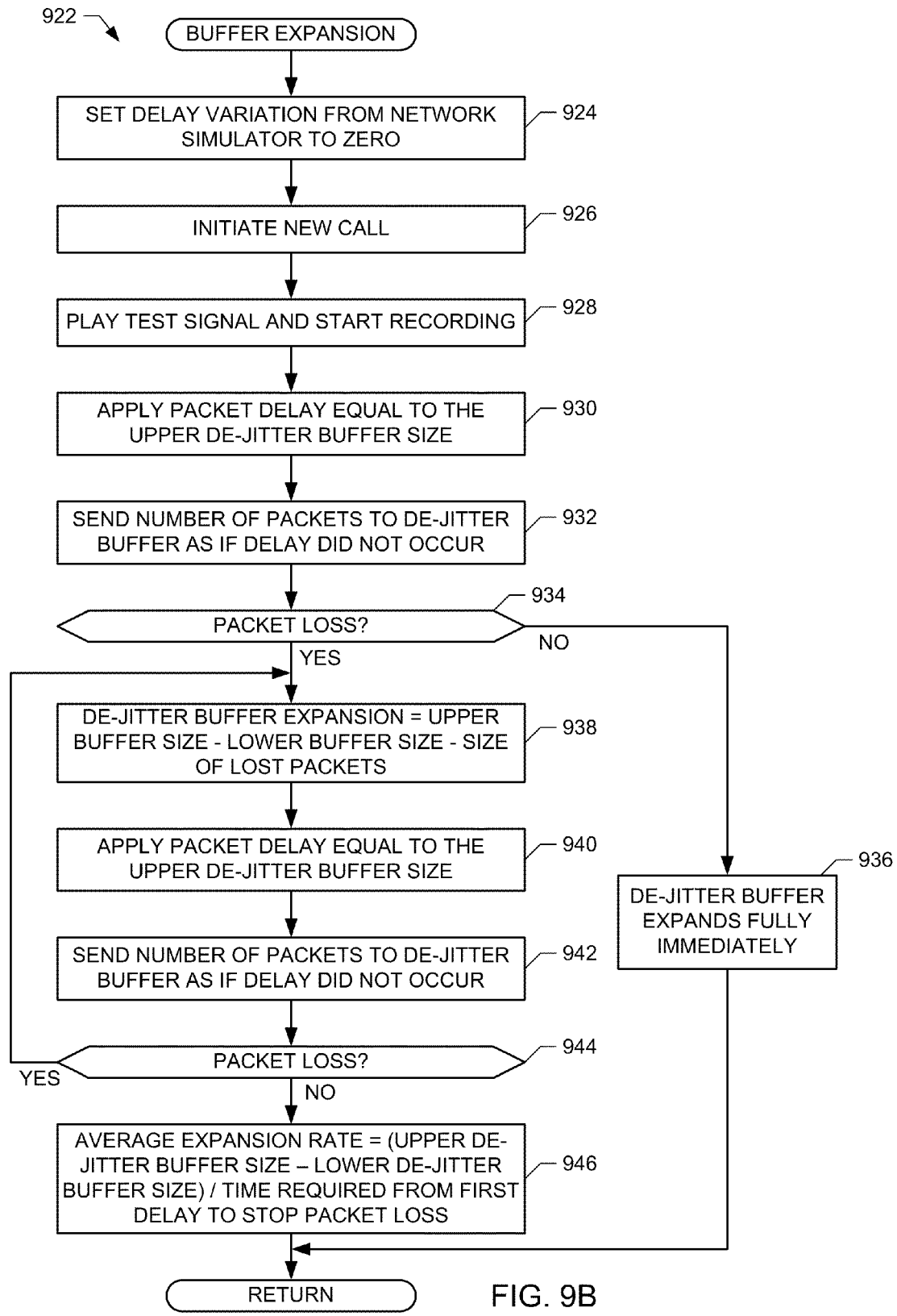
FIG. 9B is a flowchart representative of example alternative machine readable instructions which may be executed to measure a de-jitter buffer expansion speed.

FIG. 9B is a flowchart representative of example alternative machine readable instructions 922 which may be executed to measure a de-jitter buffer expansion speed. The example instructions 922 may be implemented as an alternative or in addition to the example instructions 900 of FIG. 9A to implement block 206 of FIG. 2.

The example instructions 922 begin by setting delay variation at the network simulator 108 to zero (block 924). The audio communication devices 104 and 106 initiate a new call (block 926). The example test signal generator 112 generates a known test signal for transmission to the audio communication device 106 via the de-jitter buffer 110, and the signal recorder 114 begins recording the signals received by the audio communication device 106 (block 928).

The network simulator 108 applies a delay equal to the upper size of the de-jitter buffer 110 to the packets sent to the de-jitter buffer 110 (block 930). The upper size is previously determined in block 204 of FIG. 2. After the delay, the network simulator 108 sends all of the packets to the de-jitter buffer 110 at the same time that should have been sent during the delay (block 932). For example, if the upper size is equal to 200 ms and the packets are each 20 ms long, the network simulator 108 sends 10 packets to the de-jitter buffer 110 at the same time. The analyzer 116 then determines whether packet loss has occurred due to sending the packets to the de-jitter buffer 110 (block 934).

If packet loss has not occurred (block 934), the analyzer 116 determines that the de-jitter buffer 110 expands to its upper size immediately upon detecting inter-packet delay variation (block 936). If packet loss has occurred (block 934), the analyzer 116 determines how much the de-jitter buffer 110 has expanded by subtracting both the size of the lost or dropped packets and the lower size of the de-jitter buffer 110 from the upper size of the buffer 110 (block 938). The analyzer 116 may determine the size of the lost packets by measuring a length of a gap in the signal recorded by the signal recorder 114.

The example network simulator 108 then applies a packet delay equal to the upper size of the de-jitter buffer 110 (block 940). After applying the packet delay (block 940), the network simulator 108 sends a number of packets to the de-jitter buffer 110 at the same time as if the delay had not happened (block 942). The analyzer 116 then determines whether packet loss has occurred (block 944). Blocks 940-944 are performed in a manner substantially identical to blocks 930-934, respectively.

If packet loss has occurred (block 944), control returns to block 938 to determine the de-jitter buffer size. If packet loss has not occurred (block 944), the analyzer 116 determines the average expansion rate of the de-jitter buffer 110 (block 946). To determine the average expansion rate, the analyzer 116 determines the time required from the first delay (block 932) until packet loss stops (block 944). The average expansion rate is equal to the upper size of the de-jitter buffer 110 less the lower size of the de-jitter buffer 110, divided by the time to stop the packet loss.

Figure 10A:
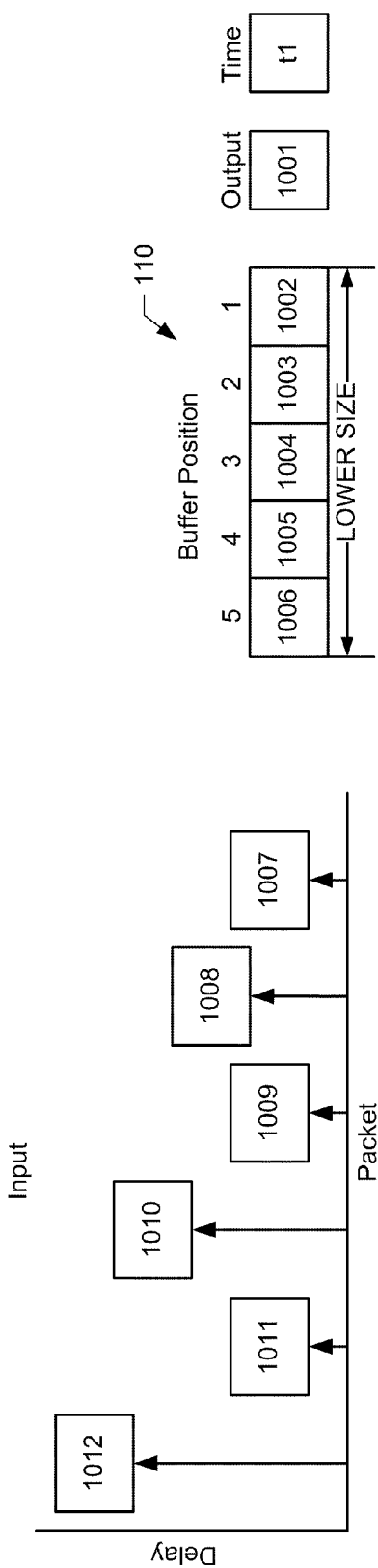
FIGS. 10A, 10B, 10C, and 10D are example time sequence diagrams illustrating an example de-jitter buffer during the process of FIG. 9A to measure de-jitter buffer expansion speed.

FIGS. 10A, 10B, 10C, and 10D are example time sequence diagrams illustrating an example de-jitter buffer 110 during an example process to measure de-jitter buffer expansion speed as described with reference to FIG. 9A. As illustrated in FIG. 10A, the de-jitter buffer 110 receives packets at the left side and outputs packets at the right side. The de-jitter buffer 110 includes two portions: a lower portion corresponding to the lower size (e.g., 5 buffer positions) and an expandable portion (e.g., up to 5 buffer positions). In FIG. 10A, only the lower portion is initially used and, thus, the de-jitter buffer 110 is at its lower size.

Figure 10B:
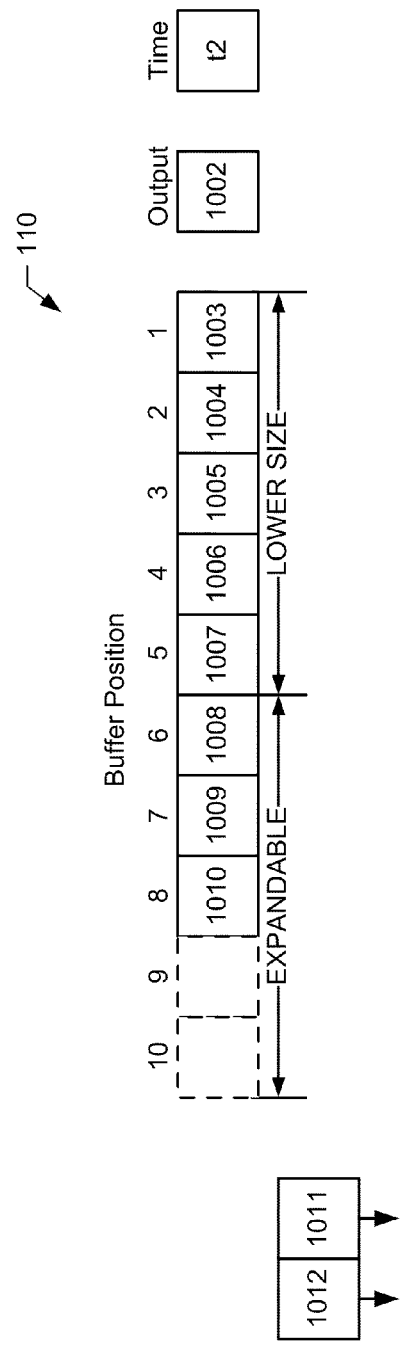

At time t1, the example de-jitter buffer 110 is at its lower de-jitter buffer size (i.e., only the lower portion is filled). Several packets 1007, 1008, 1009, 1010, 1011, and 1012 are input to the de-jitter buffer 110, where the set of packets 1007-1012 has an inter-packet delay variation that changes at a rate of R (e.g., 100 ms/t seconds). The expandable portion of the de-jitter buffer 110 typically increases as the de-jitter buffer 110 detects increasing inter-packet delay variation. However, in the examples of FIGS. 10A and 10B, the change rate R causes the delay variation to increase more rapidly than the de-jitter buffer 110 can expand. As a result, some packets (e.g., the example packets 1011 and 1012) are dropped between time t1 and time t2 as illustrated in FIG. 10B. While the buffer positions 9 and 10 are provisionable to the de-jitter buffer 110, the buffer 110 has not yet expanded to include the buffer positions 9 and 10.

The packet drops may be observed by the analyzer 116 when analyzing a recording of the received signal (e.g., the packets output from the de-jitter buffer 110) as recorded by the signal recorder 114. After determining that the change rate R is too high (i.e., because there is packet loss), the analyzer 116 controls the network simulator 108 to reduce the change rate R by an incremental amount for a subsequent test.

Figure 10C:
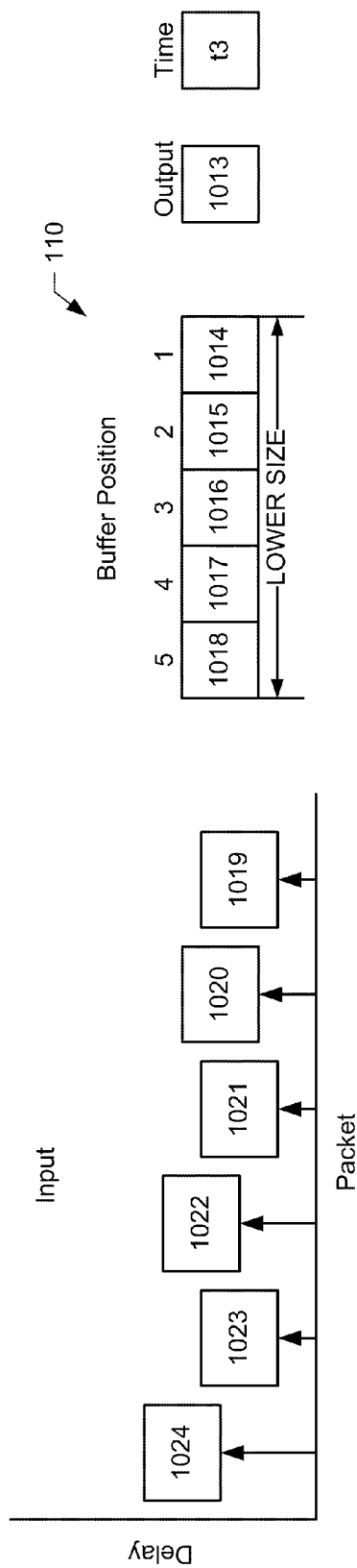
Figure 10D:
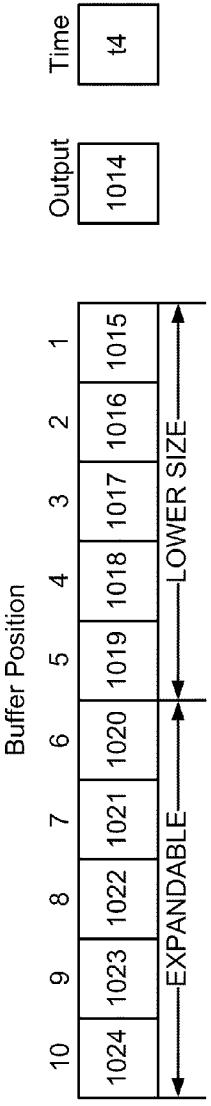

FIG. 10C illustrates the example de-jitter buffer 110 and several packets 1019-1024 in the subsequent test. In the example of FIG. 10C, the inter-packet delay variation change rate R' is lower than the change rate R of the example illustrated in FIG. 10A. At example time t3, the example de-jitter buffer 110 is at its lower de-jitter buffer size (e.g., only the lower portion is filled). Several packets 1019, 1020, 1021, 1022, 1023, and 1024 are input to the de-jitter buffer 110, where the set of packets 1019-1024 has an inter-packet delay variation that changes at an incrementally lower rate of R' (e.g., 100 ms/(2 t) seconds). The size of the expandable portion increases as the de-jitter buffer 110 detects increasing inter-packet delay variation. In the example of FIG. 10C, the change rate R' is low enough that the de-jitter buffer 110 can expand to avoid any packet loss as the packets 1019-1024 are received. As illustrated in FIG. 10D, the de-jitter buffer 110 expands to buffer and process all of the received packets 1019-1024. The analyzer 116 may then determine that the change rate R' illustrated in FIG. 10C is the de-jitter buffer 110 expansion speed because the next incrementally higher rate R caused packet loss.

Alternatively, the analyzer 116 may retest the de-jitter buffer 110 with an inter-packet delay variation change rate R" that is slightly larger than the previous rate R'. If the new change rate R" also does not result in packet loss, the analyzer 116 may determine that the new rate R" is the de-jitter buffer expansion speed or retest again until a rate at which packet loss occurs is recorded. If the new change rate R" does result in packet loss, the analyzer 116 may either determine that the previous rate R' is the de-jitter buffer expansion speed, or retest at an inter-packet delay variation change rate that falls between the new rate R" and the previous rate R'. Retesting the de-jitter buffer 110 after determining an inter-packet delay variation change rate R' at which no packet loss occurs may determine a more precise adaptive de-jitter buffer 110 expansion speed.

FIGS. 10E, 10F, and 10G illustrate example time sequence diagrams during execution of the instructions 922 of FIG. 9B for a de-jitter buffer 110 that expands immediately to its upper size when inter-packet delay variation is detected. In the examples of FIGS. 10E-10G, the upper size of the de-jitter buffer 110 has been determined in block 204 of FIG. 2 to be u ms, or the size of 10 packets. Turning to FIG. 10E, the example time sequence diagram illustrates the de-jitter buffer 110 and the network simulator 108 prior to performing block 930 of the instructions 922. At time t1, the de-jitter buffer 110 is at its lower size of 5 packets and holds 5 packets 1026-1030.

For purposes of illustration, at time t1, 10 packets 1031-1040 are at some point in the example packet-switched network 102 en route to the network simulator 108. However, any one or more of the packets 1031-1040 may not yet be generated at time t1. During ordinary operation prior to time t1, the network simulator 108 does not add any inter-packet delay variation to the packets 1031-1040 and forwards the packets to the de-jitter buffer 110 as the packets 1031-1040 are received. However, at time t1 the network simulator 108 adds a packet delay equal to the upper size (e.g., u ms) of the de-jitter buffer 110 (e.g., block 930 of FIG. 9B). During the u ms delay, the network simulator 108 collects and holds u ms of packets while the de-jitter buffer 110 outputs packets 1026-1030 at a constant rate, during which time the de-jitter buffer 110 empties.

FIG. 10F illustrates the example de-jitter buffer 110 and the network simulator 108 at time t1+u. At time t1+u, the de-jitter buffer 110 is empty and the network simulator 108 has collected (i.e., delayed) u ms worth of the packets 1031-1040. Additionally, the de-jitter buffer 110 has expanded to its upper size because it has detected packet delay variation (e.g., detected when the packet 1031 was not input to the de-jitter buffer 110 within an appropriate time after packet 1030 was input to the buffer 110).

FIG. 10G illustrates the example de-jitter buffer 110 and the network simulator 108 at some time dt after time t1+u. The time dt may be small, so that t1+u+dt is immediately after time t1+u. After the u ms delay, the network simulator 108 sends all the delayed or collected packets 1031-1040 to the de-jitter buffer 110 at the same time (e.g., block 932 of FIG. 9B). Because the de-jitter buffer 110 immediately expanded to its upper size instead of incrementally increasing in size, all the delayed packets 1031-1040 fit in the de-jitter buffer 110 and none of the packets 1031-1040 overflowed or needed to be dropped. Thus, the analyzer 116 may analyze the recorded output signal from the de-jitter buffer 110 and determine that the de-jitter buffer 110 increased to its upper size immediately because no packets were dropped from the signal (e.g., block 936 of FIG. 9B).

Figure 10H:
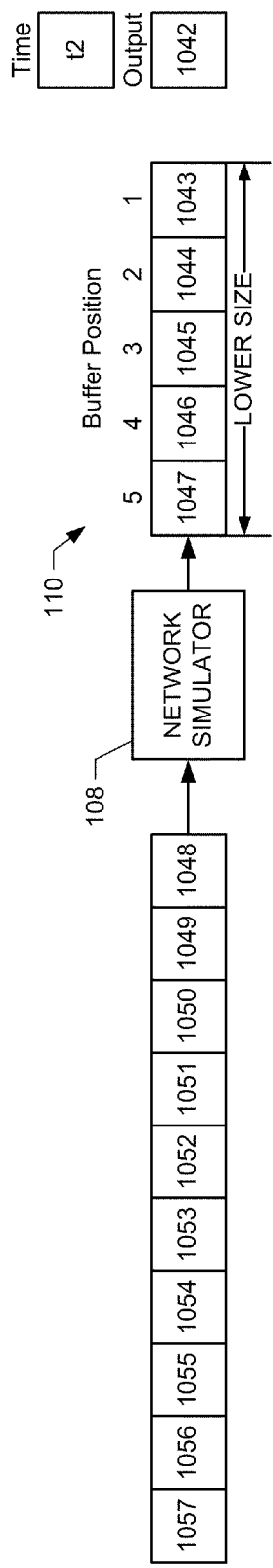
Figure 10I:
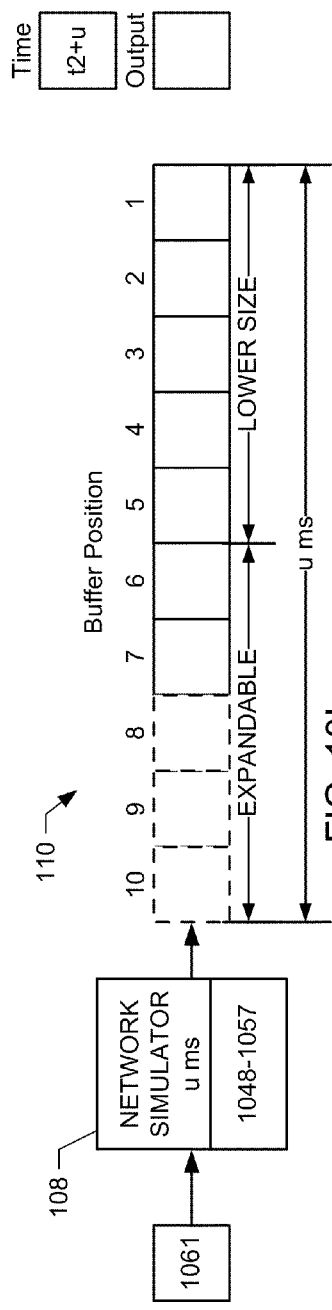
Figure 10J:
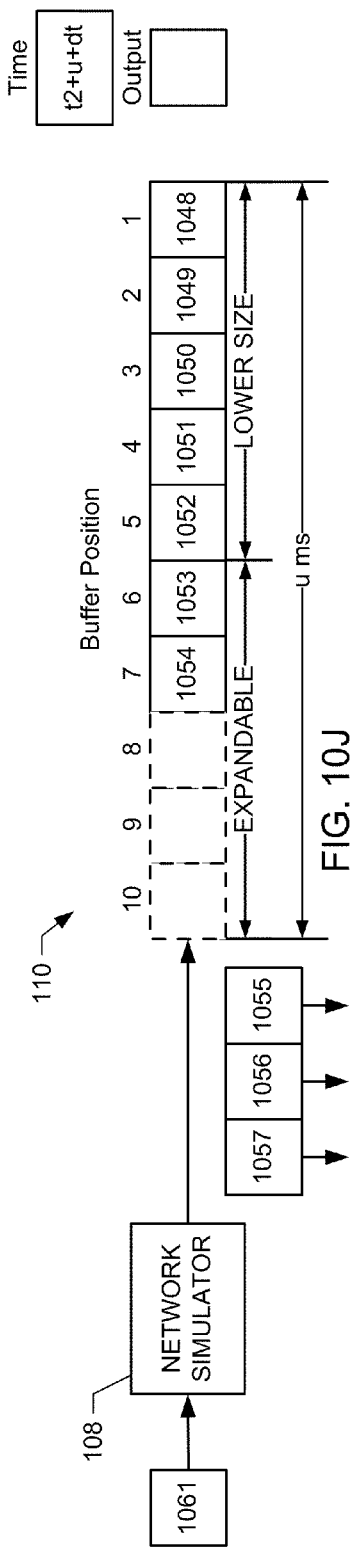

FIGS. 10H, 10I, and 10J illustrate example time sequence diagrams during execution of the instructions 922 of FIG. 9B for a de-jitter buffer 110 that expands incrementally as inter-packet delay variation increases. As in FIGS. 10E-10G, the upper size of the de-jitter buffer 110 in FIGS. 10H-10J has been determined in block 204 of FIG. 2 to be u ms, or the size of 10 packets. Turning to FIG. 10H, the example time sequence diagram illustrates the de-jitter buffer 110 and the network simulator 108 prior performing block 930 of the instructions 922. At time t2, the de-jitter buffer 110 is at its lower size of 5 packets and holds 5 packets 1043-1047.

For purposes of illustration, at time t2, 10 packets 1048-1057 are at some point in the example packet-switched network 102 en route to the network simulator 108. However, any one or more of the packets 1048-1057 may not yet be generated at time t2. During ordinary operation prior to time t2, the network simulator 108 does not add any inter-packet delay variation to the packets 1048-1057 and forwards the packets to the de-jitter buffer 110 as the packets 1048-1057 are received. However, at time t2 the network simulator 108 adds a packet delay equal to the upper size (e.g., u ms) of the de-jitter buffer 110 (e.g., block 930 of FIG. 9B). During the u ms delay, the network simulator 108 collects and holds u ms of packets while the de-jitter buffer 110 outputs packets 1043-1047 at a constant rate, during which time the de-jitter buffer 110 empties.

FIG. 10I illustrates the example de-jitter buffer 110 and the network simulator 108 at time t2+u. At time t2+u, the de-jitter buffer 110 is empty and the network simulator 108 has collected (i.e., delayed) u ms worth of the packets 1031-1040. In the example of FIG. 10I, the de-jitter buffer 110 has expanded incrementally by the size of two packets because it has detected packet delay variation (e.g., detected when the packet 1048 was not input to the de-jitter buffer 110 within an appropriate time after packet 1047 was input to the buffer 110). The example buffer positions 8, 9, and 10 have not yet been allocated for use by the de-jitter buffer 110 (i.e., the de-jitter buffer 110 has not expanded to include the buffer positions 8-10), but may be allocated to the de-jitter buffer 110 if the buffer 110 needs to expand further.

FIG. 10J illustrates the example de-jitter buffer 110 and the network simulator 108 at some time dt after time t2+u. The time dt may be small, so that t2+u+dt is immediately after time t2+u. After the u ms delay, the network simulator 108 sends all the delayed or collected packets 1048-1057 to the de-jitter buffer 110 at the same time (e.g., block 932 of FIG. 9B). Because the de-jitter buffer 110 incrementally increased in size by two buffer positions, only the delayed packets 1048-1054 fit in the de-jitter buffer 110 and the packets 1055, 1056, and 1057 are dropped due to overflow. Thus, the analyzer 116 may analyze the recorded output signal from the de-jitter buffer 110 and determine that the de-jitter buffer 110 dropped three packets 1055-1057. Additionally, the analyzer 116 may determine how much the de-jitter buffer 110 has expanded by determining the number of dropped packets (e.g., block 938 of FIG. 9B). By subtracting the number of dropped packets (e.g., 3) and the lower size (e.g., 5) from the upper size of the de-jitter buffer (e.g., 10 packets, u ms), the analyzer 116 may determine that the de-jitter buffer 110 expanded by the length of 2 packets (e.g., upper size 10 packets−lower size 5 packets−3 dropped packets=length of 2 packets).

Figure 11:
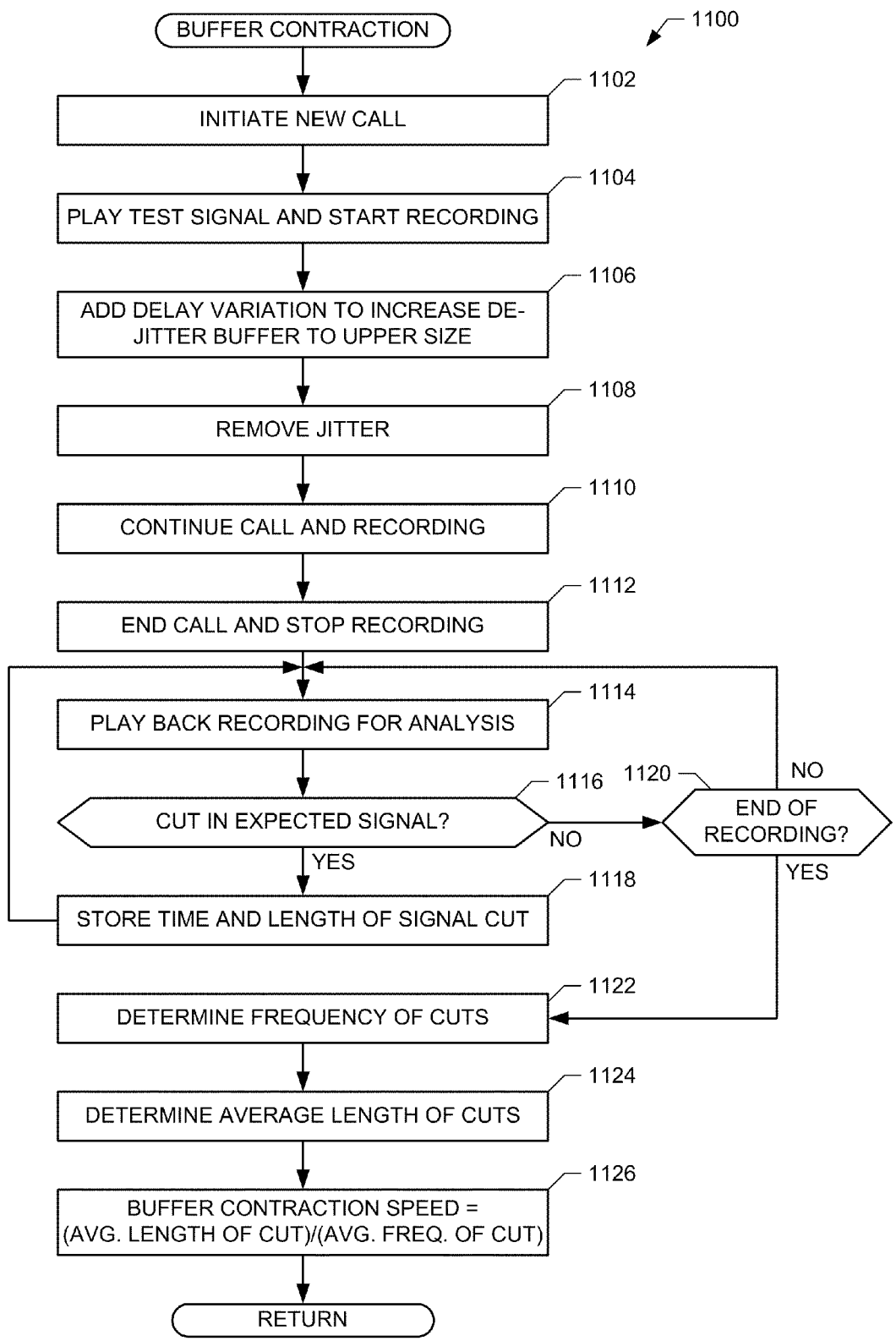
FIG. 11 is a flowchart representative of example machine readable instructions which may be executed to measure de-jitter buffer contraction speed.

FIG. 11 is a flowchart representative of example machine readable instructions 1100 which may be executed to measure contraction speed of the de-jitter buffer 110. The example instructions 1100 may be executed by the test network 100 of FIG. 1 to implement block 208 of FIG. 2. To start the instructions 1100, the example audio communication devices 104 and 106 initiate a new call (block 1102). The example test signal generator 112 generates a known test signal for transmission to the audio communication device 106 via the de-jitter buffer 110, and the signal recorder 114 begins recording the signals received by the audio communication device 106 (block 1104). Knowing the upper size and the expansion rate of the de-jitter buffer 110, the analyzer 116 instructs the network simulator 108 to add sufficient inter-packet delay variation to cause the de-jitter buffer 110 to reach the upper size determined in block 206 of FIG. 2 (block 1106).

After the de-jitter buffer 110 has fully expanded (i.e., reached the upper size), the analyzer 116 instructs the network simulator 108 to remove the added inter-packet delay variation (block 1108). With the inter-packet delay variation removed, the call continues as the signal recorder 114 continues to record the received signals (block 1110). After a sufficient time (e.g., 20-30 seconds), the audio communication devices 104 and 106 end the call and the signal recorder 114 stops recording (block 1112).

The analyzer 116 plays back the recording for analysis (block 1114). As the recording plays back, the analyzer 116 determines whether there is a cut in the expected signal (e.g., the known signal transmitted by the test signal generator 112) (block 1116). A cut in the signal occurs when a portion of audio content is removed from the voice stream (e.g., a partial or full packet of audio information is dropped by the de-jitter buffer 110). However, a cut is distinguishable from a signal gap because the audio information following the cut is played in the voice signal directly after the packet preceding the cut instead of no signal or a packet loss concealment algorithm. Thus, the recorded output signal does not show any gaps. The analyzer 116 may detect a signal cut because the analyzer 116 has a priori knowledge of the expected signal. If there is a cut in the expected signal (block 1116), the analyzer 116 stores the time and the length of the signal cut (block 1118). Control then returns to block 1114 to continue playing back the recording. If there is no cut in the expected signal (block 1116), the analyzer 116 determines whether the end of the recording has been reached (block 1120). If the end of the recording has not been reached (block 1120), control returns to block 1114 to continue playback.

If the end of the recording has been reached (block 1120), the analyzer 116 determines the frequency of all the stored signal cuts (block 1122). The frequency of the signal cuts may be expressed as, for example, the average number of signal cuts per unit time. The analyzer 116 also determines the average length of the signal cuts (block 1124). Some de-jitter buffers 110 may cut different amounts of signal upon contraction of the buffer 110 at different times, or may cut the same amount of signal at each contraction. The analyzer 116 then determines the de-jitter buffer 110 contraction speed to be the average length of signal cut divided by the average frequency of the signal cuts (block 1126). After determining the contraction speed, the example instructions 1100 end and control returns to block 210 of FIG. 2.

Figure 12:
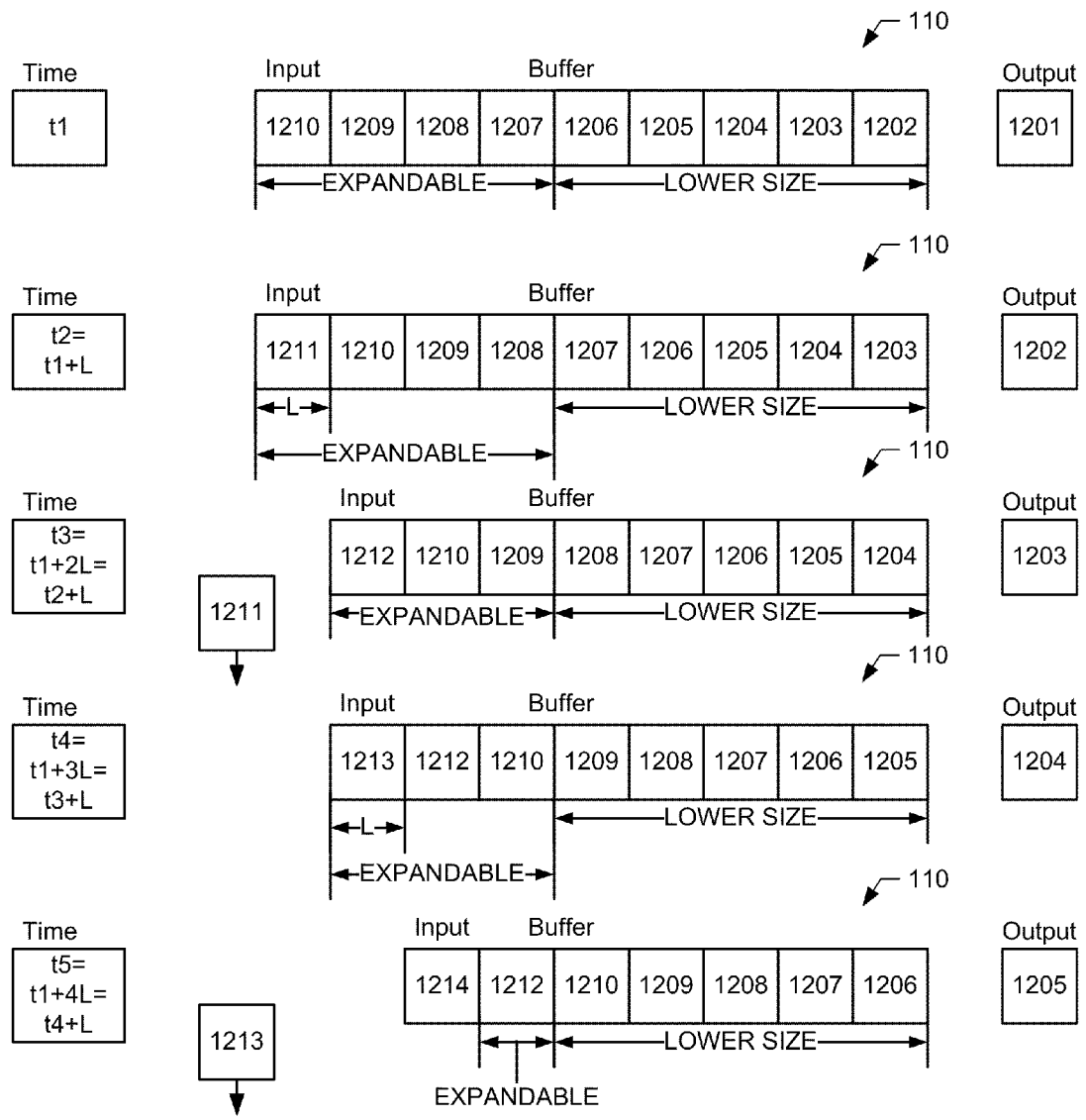
FIG. 12 is a time sequence diagram illustrating an example de-jitter buffer during a process to measure the de-jitter buffer contraction speed.

FIG. 12 is a time sequence diagram illustrating an example de-jitter buffer 110 during a process to measure the de-jitter buffer 110 contraction speed. At time t1, the de-jitter buffer 110 is completely filled (e.g., the lower portion is full and the expandable portion is expanded and also filled completely) and the network simulator 108 has stopped adding inter-packet delay variation from an incoming packet 1210 for some time. Additionally, at time t1 the de-jitter buffer 110 outputs a packet 1201. As a result, the packet 1210 enters the de-jitter buffer 110 as the data in the de-jitter buffer 110 shifts when the buffer 110 outputs packet 1201. At time t2 (t2=t1+L, where L is equal to the packet length), the de-jitter buffer 110 receives another packet 1211 and outputs packet 1202. However, the de-jitter buffer 110 contracts at time t3 (t3=t2+L=t1+2L) due to a reduction in inter-packet delay variation. In the illustrated example, the contraction is by one packet size (e.g., L). As a result, the de-jitter buffer 110 must drop a packet (e.g., the most-recently received packet 1211) having length L. The example de-jitter buffer 110 of FIG. 12 also receives another packet 1212 at time t3. Depending on when the de-jitter buffer 110 receives the packet 1212 and when the de-jitter buffer 110 contracts, the newly-received packet 1212 may be dropped instead of the packet 1211. Alternatively, packets in other portions of the de-jitter buffer 110 may be dropped instead. Regardless of which packet is dropped, the output signal will experience a cut (e.g., a dropped packet).

The de-jitter buffer 110 receives another packet 1213 at time t4 (t4=t3+L=t1+3L) and outputs a packet 1204. The de-jitter buffer 110 contracts by an amount L again at time t5 (t5=t4+L=t1+4L). Accordingly, the buffer 110 must drop another packet 1213. The drop of the packet 1213 results in another signal cut at the output when, in the absence of the contraction, the dropped packet 1213 would have been output. The de-jitter buffer 110 also receives another packet 1214 at time t5.

When the analyzer 116 analyzes the signal cuts, the average cut length is determined to be L because each of the example dropped packets had a length L. In some examples, a portion of a packet or multiple packets are cut or dropped. In the illustrated example, the cuts occur every 2*L after the de-jitter buffer 110 begins contracting (e.g., at times t3=3*L, t5=5*L, etc.). Therefore, the analyzer 116 determines the contraction speed for the example of FIG. 12 to be: (length of the contractions)*(frequency of the contractions), or $L*(2*L)^{-1}$. Many de-jitter buffers 110 have a slow contraction rate (e.g., a portion of a 20 ms packet is cut once per second). While the de-jitter buffer 110 detects no inter-packet delay variation in incoming packets, the example de-jitter buffer 110 will continue to contract in constant lengths L every 2*L seconds until the buffer 110 reaches its lower size. Some buffers will contract in the presence of inter-packet delay variation. Additionally, the cuts do not necessarily correspond to the packet size L. Instead, cuts may occur in lengths shorter or longer than L.

Figure 13:
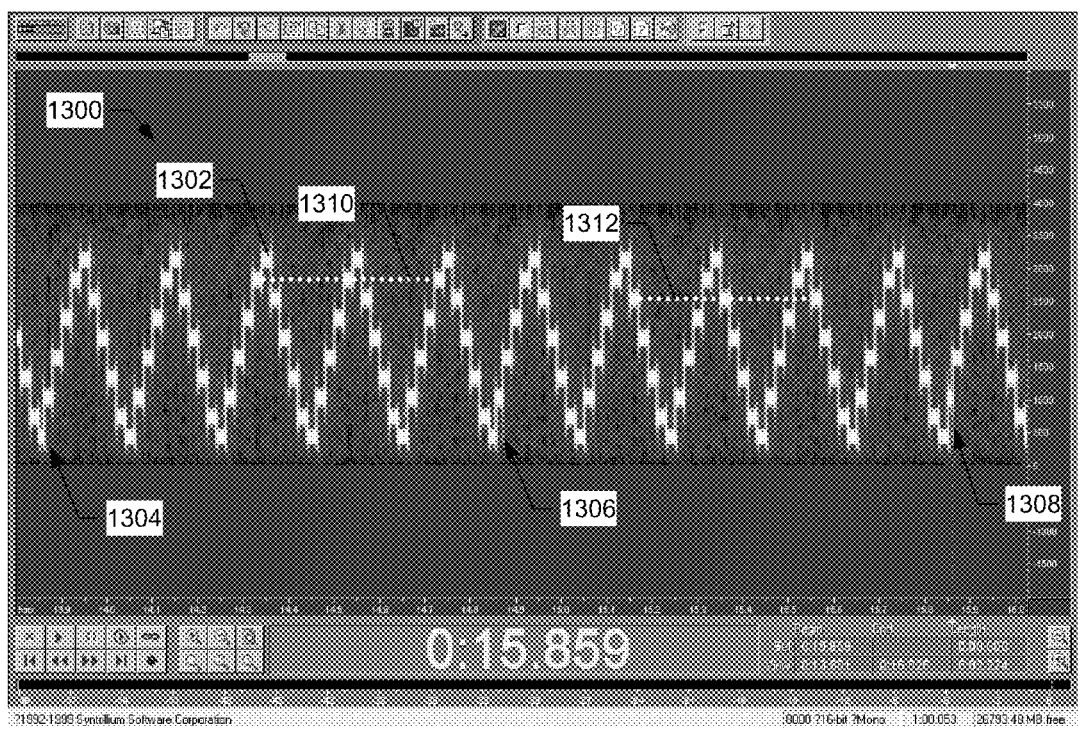
FIG. 13 illustrates an example visual analysis of a recording to determine a de-jitter buffer contraction speed.

FIG. 13 illustrates an example visual analysis 1300 of a recorded signal 1302 to determine a de-jitter buffer contraction speed. As illustrated in FIG. 13, signal cuts 1304, 1306, and 1308 occur at 13.86 seconds, 14.86 seconds, and 15.86 seconds, respectively. In other words, the example de-jitter buffer under test (e.g., the de-jitter buffer 110 of FIG. 1) contracts every 1 second. The illustrated recorded signal represents a known test signal generated by the test signal generator 112 of FIG. 1 and is described in more detail below with reference to FIGS. 14 and 15, where each frequency level (e.g., frequency levels 1310, 1312) is held for 20 ms before changing to a next frequency level. At each observed signal cut 1304, 1306, and 1308, the frequency level is held for 10 ms before changing to the next frequency level. Therefore, the length of each signal cut 1304-1308 is a time of 10 ms. The 10 ms signal cut length occurs every 1 second. Therefore, the contraction speed according to the illustrated visual analysis 1300 is equal to: (length of the contractions (e.g., 10 ms))*(frequency of the contractions (e.g., 1/(1 second))), or 10 ms/second.

Figure 14:
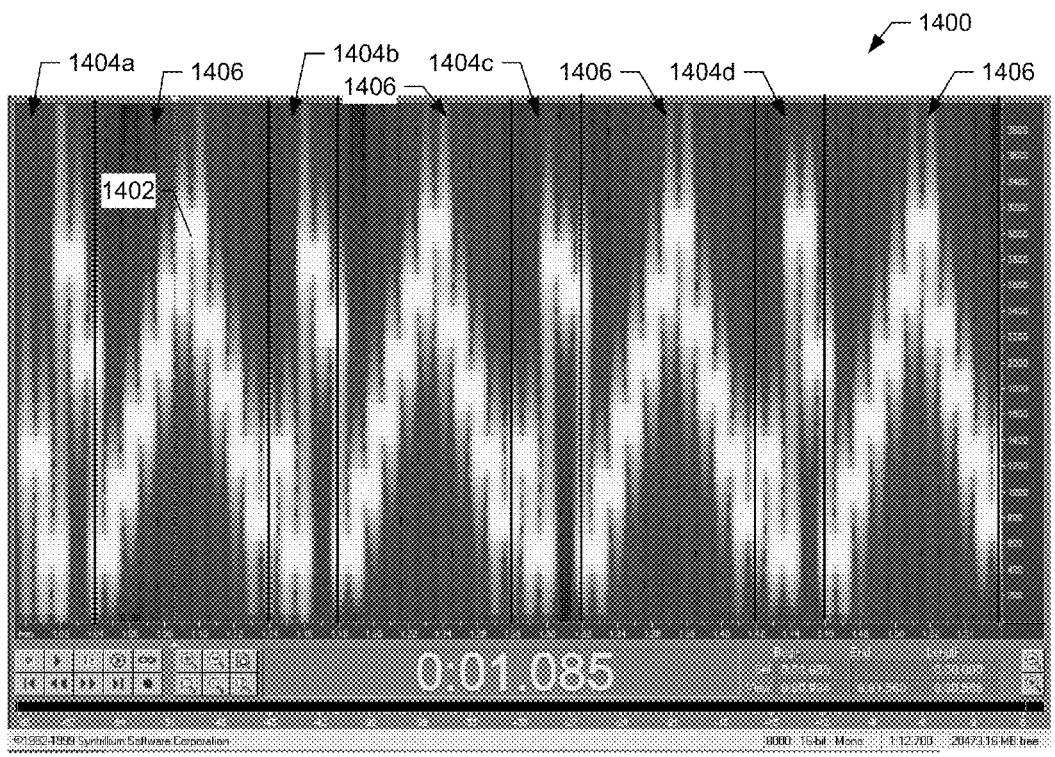
FIG. 14 is a spectrogram of an example test signal that may be used to implement the example systems and methods described herein.
Figure 15:
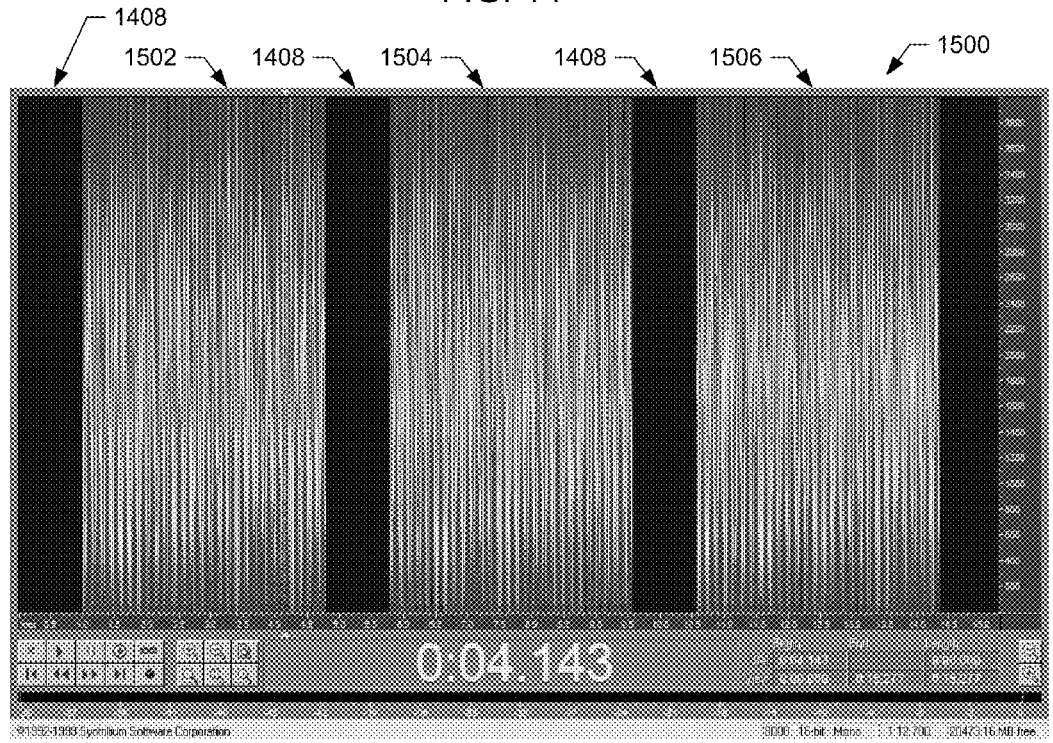
FIG. 15 is another spectrogram of the example test signal of FIG. 14.

FIGS. 14 and 15 illustrate spectrograms 1400 and 1500 of an example test signal 1402. The test signal generator 112 of FIG. 1 may transmit the example test signal 1402 to provide a known test signal to the de-jitter buffer 110, the signal recorder 114, and/or the audio communication device 106. The spectrograms 1400 and 1500 show time on the horizontal axes, frequency on the vertical axes, and the power of the test signal 1402 at each frequency between 0 and 4000 Hz is shown via shades (dark is low power and bright is high power).

The example test signal 1402 has three components: index patterns 1404a, 1404b, 1404c, and 1404d, a base pattern 1406, and a silence period 1408. Each index pattern 1404a, 1404b, 1404c, and 1404d is a sequence of tones which may be used by the analyzer 116 to synchronize the received signal and the original signal. The example index pattern 1404 uses four groups of three distinct frequencies each. One frequency from each of these groups is used in the index, creating a total of 81 different index patterns. The example frequency groups are: 1) 1254, 1504, 1754 Hz; 2) 504, 754, 1004 Hz; 3) 2754, 3004, 3254 Hz; and 4) 2004, 2254, 2504 Hz. The index pattern 1404a-d changes after each base pattern 1406.

The base pattern 1406 is a repeating sequence of tones which is played after each index pattern 1404a-d. The base pattern 1406 of the illustrated example uses the following sequence of frequencies: 504, 1004, 1504, 2004, 2504, 3004, 2254, 1754, 1254, and 754 Hz. Each of the frequencies in the example index 1404a, 1404b, 1404c, 1404d and base 1406 patterns are selected to be the midpoints of frequency bins produced by a Fast Fourier Transform (FFT) operating on 32 samples (4 ms) of example data taken from a telephone network. However, other frequencies may be chosen depending on the expected frequency range, audio compression, and/or capabilities of the network handling of audio data. The analyzer 116 may use the FFT to identify the frequencies in the received signal. The silence periods 1408 may be used to determine if the de-jitter buffer 110 makes modifications to its size during silence to avoid adding discernible impairments. For example, the length of the silence period may be measured and compared to the known length of the silence period 1408 in the test signal. If the silence period 1408 is shorter, the example de-jitter buffer 110 may have contracted during the silence period 1408. In contrast, if the silence period 1408 is longer, the example de-jitter buffer 110 may have expanded.

FIG. 14 illustrates a spectrogram 1400 of four repetitions of the index 1404a, 1404b, 1404c, and 1404d and base patterns 1406. In the illustrated example, the first index pattern 1404a includes the sequence of frequencies 1254, 504, 2754, and 2004. The example first index pattern 1404a is followed by the base pattern 1406. The example second index pattern 1404b includes the sequence of frequencies 1254, 504, 2754, and 2254, and is followed by the same base pattern 1406. The example third index pattern 1404c includes the sequence of frequencies 1254, 504, 2754, and 2504, and is followed by the base pattern 1406. The fourth illustrated index pattern 1404d includes the sequence of frequencies 1254, 504, 3004, and 2004. Again, the fourth index pattern 1404d is followed by the base pattern 1406, and so on. The first three index patterns 1404a, 1404b, and 1404c use the same frequencies for the first three tones (1254, 504, 2754 Hz) and vary the fourth tone. A similar variation in the index patterns 1404a, 1404b, 1404c, and 1404d is continued until all 81 index patterns have been used, at which point the example test signal 1402 starts at the initial index pattern 1404a again.

Each of the individual frequencies in the example index 1404a, 1404b, 1404c, 1404d and base patterns 1406 are played for 10 ms. The 10 ms length is advantageous because some de-jitter buffers expand and decrease in size in 10 ms or larger increments. Other lengths may be chosen based on the measurement application.

As illustrated in FIG. 15, the example test signal 1402 starts with a one second silence period 1408. A first sequence 1502 of 27 different index patterns, each followed by the base pattern 1406, is then played. The sequence 1502 is followed by a one second silence period 1408. The silence period 1408 is followed by a second sequence 1504 of 27 new index patterns, each followed by base patterns 1406. The second sequence 1504 is followed by another one second silence period 1408. The basic test signal 1402 is completed by playing a third sequence 1506 of the final 27 index patterns, each followed by the base pattern 1406.

The example test signal 1402 lasts 14.34 seconds. However, the test signal 1402 can be repeated multiple times to create a longer test signal to identify slower changes in the de-jitter buffer 110. For example, five repetitions of the example test signal 1402 provides a 72.7 second long test signal.

Figure 16:
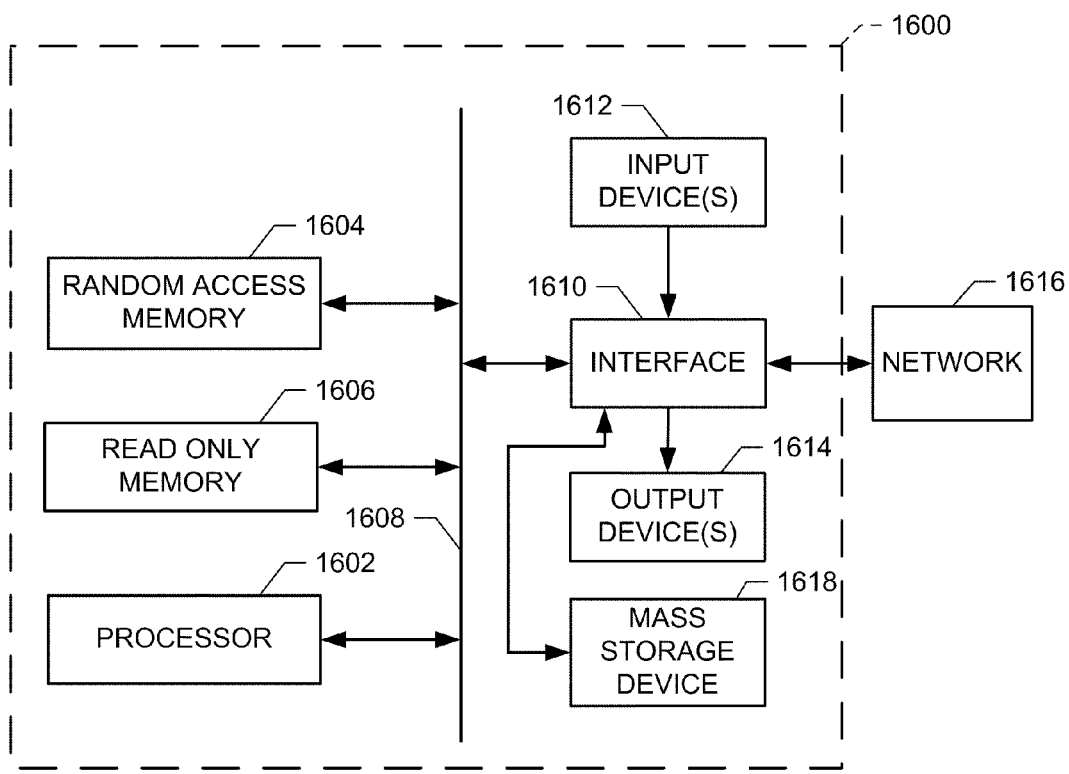
FIG. 16 is a block diagram of an example processing system that may execute the example machine readable instructions of FIGS. 2, 3, 7, 9 and/or to implement the example test network of FIG. 1.

FIG. 16 is a block diagram of an example processing system 1600 that may execute the example machine readable instructions of FIGS. 2, 3, 7, 9A, 9B and/or 11 to implement some or all of the example network simulator 108, the example de-jitter buffer 110, the example test signal generator 112, the example signal recorder 114, the example analyzer 116 and/or, more generally, the example test network 100 of FIG. 1. The processing system 1600 can be, for example, a server, a personal computer, a personal digital assistant (PDA), an Internet appliance, a DVD player, a CD player, a digital video recorder, a personal video recorder, a set top box, a VoIP telephone, an analog telephony adapter, or any other type of computing device.

A processor 1602 is in communication with a main memory including a volatile memory 1604 and a non-volatile memory 1606 via a bus 1608. The volatile memory 1604 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1606 may be implemented by flash memory and/or any other desired type of memory device. Access to the main memory 1604, 1606 is controlled by a memory controller (not shown).

The processing system 1600 also includes an interface circuit 1610. The interface circuit 1610 may be implemented by any type of interface standard, such as an Ethernet interface, a universal serial bus (USB), and/or a third generation input/output (3GIO) interface.

One or more input devices 1612 are connected to the interface circuit 1610. The input device(s) 1612 permit a user to enter data and commands into the processor 1602. The input device(s) can be implemented by, for example, a keyboard, a mouse, a touchscreen, a track-pad, a trackball, isopoint and/or a voice recognition system.

One or more output devices 1614 are also connected to the interface circuit 1610. The output devices 1614 can be implemented, for example, by display devices, such as a liquid crystal display, a cathode ray tube display (CRT), a printer and/or speakers. The interface circuit 1610, thus, typically includes a graphics driver card.

The interface circuit 1610 also includes a communication device such as a modem or network interface card to facilitate exchange of data with external computers via a network 1616, such as an Ethernet connection, a digital subscriber line (DSL), a telephone line, coaxial cable, a cellular telephone system or any other network interface. The network 1616 may be implemented via the packet-switched network 102 and/or the network simulator 108 of FIG. 1.

The processing system 1600 also includes one or more mass storage devices 1618 for storing software and data. Examples of such mass storage devices 1618 include floppy disk drives, hard drive disks, compact disk drives and digital versatile disk (DVD) drives.

As an alternative to implementing the methods and/or apparatus described herein in a system such as the device of FIG. 16, the methods and/or apparatus described herein may alternatively be embedded in a structure such as processor and/or an ASIC (application specific integrated circuit).

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein may be stored on a tangible storage medium, such as: a magnetic medium, such as a magnetic disk or tape; a magneto-optical or optical medium such as an optical disk; or a solid state medium such as a memory card or other package that houses one or more read-only (non-volatile) memories, random access memories, or other re-writable (volatile) memories, or successor storage media to any of the above.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, these examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to measure de-jitter buffer performance, comprising:
   transmitting a known audio signal via a plurality of packets over a packet-based network;
   recording a received signal based on the known audio signal;
   analyzing the recorded signal to determine one or more of a lower de-jitter buffer size, an upper de-jitter buffer size, a de-jitter buffer expansion speed, or a de-jitter buffer contraction speed based on the recorded signal and the known signal;
   comparing the one or more of the lower de-jitter buffer size, the upper de-jitter buffer size, the expansion speed, or the contraction speed to a performance requirement; and
   correcting communication network performance based on the comparison, wherein determining the lower de-jitter buffer size comprises:
   adding a known delay to at least one packet of the plurality of packets;
   determining a length of a gap in the recorded signal; and
   determining the lower de-jitter buffer size based on the length of the gap and the known delay.

2. A method as defined in claim 1, wherein determining the lower de-jitter buffer size comprises subtracting the length of the gap from the known delay.

3. An adaptive de-jitter buffer testing system, comprising:
   a signal generator to transmit a known audio signal via a plurality of packets;
   a network simulator communicatively coupled to the signal generator to simulate an effect of a packet-based communication network;
   a recording device communicatively coupled to an audio communication device and to the network simulator, the recording device to record a received signal from the network simulator based on the known audio signal; and
   an analyzer to analyze the recorded signal from the recording device and to determine one or more of a lower de-jitter buffer size, an upper de-jitter buffer size, a de-jitter buffer expansion speed, or a de-jitter buffer contraction speed of the audio communication device based on the recorded signal and the known signal, wherein the network simulator adds a known delay to one of the plurality of packets, and the analyzer determines the lower de-jitter buffer size by:
   determining a length of a gap in the received signal corresponding to the delayed packet; and
   subtracting the length of the gap from the known delay.

4. A tangible article of manufacture comprising machine readable instructions which, when executed, cause a machine to at least:
   transmit a known audio signal via a plurality of packets over a packet-based network;
   record a received signal based on the known audio signal;
   analyze the recorded signal to determine one or more of a lower de-jitter buffer size, an upper de-jitter buffer size, a de-jitter buffer expansion speed, or a de-jitter buffer contraction speed based on the recorded signal and the known signal;
   compare the one or more of the lower de-jitter buffer size, the upper de-jitter buffer size, the expansion speed, or the contraction speed to a performance requirement; and
   correct communication network performance based on the comparison, wherein determining the lower de-jitter buffer size comprises:
   instructing a network simulator to add a known delay to one or more of the plurality of packets;
   determining a length of a gap in the recorded signal; and
   determining the lower de-jitter buffer size based on the length of the gap and the known delay.

* * * * *